United States Patent
Tai et al.

(10) Patent No.: US 11,373,275 B2
(45) Date of Patent: Jun. 28, 2022

(54) METHOD FOR GENERATING HIGH-RESOLUTION PICTURE, COMPUTER DEVICE, AND STORAGE MEDIUM

(71) Applicant: Tencent Technology (Shenzhen) Company Limited, Shenzhen (CN)

(72) Inventors: Yuwing Tai, Shenzhen (CN); Lizhao Gao, Shenzhen (CN); Qiang Fu, Shenzhen (CN); Fangmin Chen, Shenzhen (CN); Da Yao, Shenzhen (CN); Hengfeng Tian, Shenzhen (CN); Yubin Xie, Shenzhen (CN); Liuji Zhou, Shenzhen (CN); Tao Wang, Shenzhen (CN); Yongjian Wu, Shenzhen (CN); Junhong Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 262 days.

(21) Appl. No.: 16/862,194

(22) Filed: Apr. 29, 2020

(65) Prior Publication Data
US 2020/0258197 A1     Aug. 13, 2020

Related U.S. Application Data

(63) Continuation of application No. PCT/CN2018/166987, filed on Nov. 22, 2018.

(30) Foreign Application Priority Data

Nov. 24, 2017 (CN) .......................... 201711191101.1

(51) Int. Cl.
| | |
|---|---|
| *G06T 3/40* | (2006.01) |
| *G06N 3/08* | (2006.01) |
| *G06T 5/00* | (2006.01) |

(52) U.S. Cl.
CPC ............. *G06T 3/4076* (2013.01); *G06N 3/08* (2013.01); *G06T 3/4046* (2013.01); *G06T 3/4053* (2013.01); *G06T 5/009* (2013.01)

(58) Field of Classification Search
CPC .... G06N 3/02–088; G06T 2207/20081; G06T 2207/20084; G06T 3/40–4092; G06T 5/009
See application file for complete search history.

(56) References Cited

U.S. PATENT DOCUMENTS

2013/0028538 A1   1/2013  Simske et al.

FOREIGN PATENT DOCUMENTS

| CN | 106204449 A | 12/2016 |
|---|---|---|
| CN | 106600538 A | 4/2017 |

(Continued)

OTHER PUBLICATIONS

"Alternately, adv." OED Online. Oxford University Press, Mar. 2022. Web. Mar. 14, 2022. (Year: 2022).*

(Continued)

*Primary Examiner* — Geoffrey E Summers
(74) *Attorney, Agent, or Firm* — Morgan, Lewis & Bockius LLP

(57) ABSTRACT

This application provides a method for generating a high-resolution picture performed by a computer device. The method includes: acquiring at least one deep neural network model; acquiring a low-resolution picture; determining a corresponding deep neural network model according to the low-resolution picture; and converting the low-resolution pictures into a high-resolution picture through the deep neural network model, the deep neural network model including a plurality of non-linear conversion convolution layers that alternately use different parameter matrices as convolution template parameters.

20 Claims, 11 Drawing Sheets

(56) References Cited

FOREIGN PATENT DOCUMENTS

| CN | 106791927 A | 5/2017 |
|---|---|---|
| CN | 106910161 A | 6/2017 |
| CN | 106991646 A | 7/2017 |
| CN | 107154021 A | 9/2017 |
| CN | 107155110 A | 9/2017 |
| CN | 107240066 A | 10/2017 |
| CN | 108022212 A | 5/2018 |

OTHER PUBLICATIONS

Fan, Yuchen, et al. "Balanced Two-Stage Residual Networks for Image Super-Resolution." 2017 IEEE Conference on Computer Vision and Pattern Recognition Workshops (CVPRW). IEEE, 2017. (Year: 2017).*

Agustsson, Eirikur, and Radu Timofte. "NTIRE 2017 Challenge on Single Image Super-Resolution: Dataset and Study." 2017 IEEE Conference on Computer Vision and Pattern Recognition Workshops (Cvprw). IEEE, 2017. (Year: 2017).*

He, Kaiming, et al. "Delving Deep into Rectifiers: Surpassing Human-Level Performance on ImageNet Classification." 2015 IEEE International Conference on Computer Vision (ICCV). IEEE, 2015. (Year: 2015).*

Dong, Chao, et al. "Learning a deep convolutional network for image super-resolution." European conference on computer vision. Springer, Cham, 2014. (Year: 2014).*

Dong, Chao, Chen Change Loy, and Xiaoou Tang. "Accelerating the super-resolution convolutional neural network." European conference on computer vision. Springer, Cham, 2016. (Year: 2016).*

Kim, Jiwon, Jung Kwon Lee, and Kyoung Mu Lee. "Accurate Image Super-Resolution Using Very Deep Convolutional Networks." 2016 IEEE Conference on Computer Vision and Pattern Recognition (CVPR). IEEE, 2016. (Year: 2016).*

Szegedy, Christian, et al. "Going deeper with convolutions." 2015 IEEE Conference on Computer Vision and Pattern Recognition (CVPR). IEEE, 2015. (Year: 2015).*

Yamanaka, Jin, Shigesumi Kuwashima, and Takio Kurita. "Fast and Accurate Image Super Resolution by Deep CNN with Skip Connection and Network in Network." arXiv preprint arXiv:1707.05425v4 (2017). (Year: 2017).*

Tencent Technology, ISRWO, PCT/CN2018/116987, Feb. 15, 2019, 7 pgs.

Tencent Technology, IPRP, PCT/CN2018/116987, May 26, 2020, 6 pgs.

* cited by examiner

METHOD FOR GENERATING HIGH-RESOLUTION PICTURE, COMPUTER DEVICE, AND STORAGE MEDIUM

RELATED APPLICATION

This application is a continuation application of PCT Application No. PCT/CN2018/116987, entitled "METHOD FOR GENERATING HIGH-RESOLUTION PICTURE, COMPUTER APPARATUS, AND STORAGE MEDIUM" filed on Nov. 22, 2018, which claims priority to Chinese Patent Application No. 201711191101.1, entitled "METHOD AND DEVICE FOR GENERATING HIGH-RESOLUTION PICTURE AND STORAGE MEDIUM" filed with the Chinese National Intellectual Property Administration on Nov. 24, 2017, all of which are incorporated by reference in their entirety.

FIELD OF THE TECHNOLOGY

This application relates to the field of picture processing, and in particular, to a method for generating a high-resolution picture, a computer device, and a storage medium.

BACKGROUND OF THE DISCLOSURE

With the development of science and technology, people have increasingly high requirements for multimedia information, for example, increasing stimulation of multimedia information for perception of a user. Therefore, high-resolution multimedia information (picture information or video information) has become a mainstream multimedia file.

When both sides for interaction need to exchange high-resolution multimedia information, an interactive terminal often requires a large amount of storage media to store high-resolution multimedia, and the interactive terminal also often needs high-speed broadband for high-resolution multimedia transmission operations. In this way, interaction costs of interaction between both sides of the interaction terminal are greatly increased, and the foregoing requirements for the storage medium and a bandwidth also cause a decrease in efficiency of information interaction between the both sides of the interactive terminal.

Therefore, there is an urgent need for an image super-resolution (SR) technology that may convert a compressed low-resolution (LR) image into an original high-resolution (HR) image.

SUMMARY

According to various embodiments provided in this application, a method for generating a high-resolution picture, a computer device, and a storage medium are provided.

Embodiments of this application provide a method for generating a high-resolution picture, the method including:
acquiring, by a computer device, at least one deep neural network model, the deep neural network model being generated according to a corresponding high-resolution picture, a picture conversion algorithm, and a deep neural network framework;
acquiring, by the computer device, a low-resolution picture, the low-resolution picture being generated according to a corresponding high-resolution picture and the picture conversion algorithm;
determining, by the computer device, a corresponding deep neural network model corresponding to the low-resolution picture; and
converting, by the computer device, the low-resolution picture into the high-resolution picture using the deep neural network model;
the deep neural network model including a plurality of non-linear conversion convolution layers that alternately use different parameter matrices as convolution template parameters.

Embodiments of this application provide a computer device, including memory and a processor, the memory storing computer-readable instructions, the computer-readable instructions, when executed by the processor, causing the processor to perform the following operations:
acquiring at least one deep neural network model, the deep neural network model being generated according to a corresponding high-resolution picture, a picture conversion algorithm, and a deep neural network framework;
acquiring a low-resolution picture, the low-resolution picture being generated according to a corresponding high-resolution picture and the picture conversion algorithm; and
determining a corresponding deep neural network model corresponding to the low-resolution picture; and
converting the low-resolution picture into the high-resolution picture using the deep neural network model;
the deep neural network model including a plurality of non-linear conversion convolution layers that alternately use different parameter matrices as convolution template parameters.

Embodiments of this application provide one or more non-volatile storage media storing computer-readable instructions, the computer-readable instructions, when executed by one or more processors, causing the one or more processors to perform the following operations:
acquiring at least one deep neural network model, the deep neural network model being generated according to a corresponding high-resolution picture, a picture conversion algorithm, and a deep neural network framework;
acquiring a low-resolution picture, the low-resolution picture being generated according to a corresponding high-resolution picture and the picture conversion algorithm; and
determining a corresponding deep neural network model corresponding to the low-resolution picture; and
converting the low-resolution picture into the high-resolution picture using the deep neural network model;
the deep neural network model including a plurality of non-linear conversion convolution layers that alternately use different parameter matrices as convolution template parameters.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show some embodiments of this application, and a person of ordinary skill in the art may still derive other drawings from these accompanying drawings without creative efforts.

DESCRIPTION OF EMBODIMENTS

Figure 1:
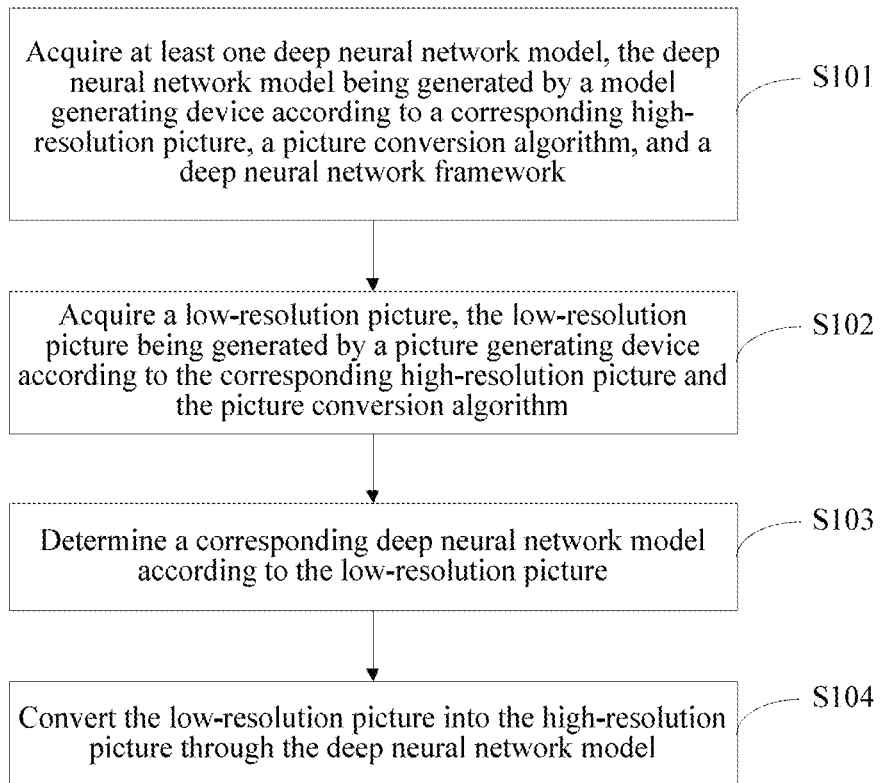
FIG. 1 is a flowchart of an embodiment of a method for generating a high-resolution picture according to this application.

To make the objectives, technical solutions, and advantages of this application clearer and more comprehensible, this application is further elaborated in detail with reference to the accompanying drawings and embodiments. It is to be understood that the specific embodiments described herein are merely used for explaining this application but are not intended to limit this application.

In the following description, the specific embodiments of this application are described with reference to steps and signs of operations that are performed by one or more computers, unless indicated otherwise. Therefore, these steps and operations may be learned from the descriptions, where it is mentioned for multiple times that the steps and operations are performed by a computer, including that the steps and operations are manipulated by a computer processing unit of an electronic signal that represents data in a structured pattern. This manipulation transforms the data or maintains it at locations in the memory system of the computer, which reconfigures or otherwise alters the operation of the computer in a manner well understood by a person skilled in the art. The data structures where data is maintained are physical locations of the memory that have particular properties defined by the format of the data. However, the principle of this application is described by using the foregoing words, but is not intended to be a limitation. A person skilled in the art may understand that the following various steps and operation may also be implemented in hardware.

According to a method for generating a high-resolution picture, a picture generating device of this application may be disposed in any electronic device, and is configured to perform a high-resolution picture conversion operation on a received low-resolution picture. The electronic device includes, but is not limited to, a wearable device, a head-mounted device, a healthcare platform, a personal computer, a server computer, a handheld or laptop device, a mobile device (for example, a mobile phone, a personal digital assistant (PDA), a media player and the like), a multiprocessor system, a consumer electronic device, a small computer, a mainframe computer, a distributed computing environment including any of the foregoing system or device, and so on. The electronic device is preferably a mobile terminal or a fixed terminal for information exchange.

According to the method for generating the high-resolution picture and the device for generating the picture of this application, conversion accuracy of restoring a compressed low-resolution picture to a high-resolution picture is improved by creating a deep neural network model with a non-linear conversion convolution layer. Since a part of an interactive terminal may only store and transmit the low-resolution picture, interaction costs of multimedia picture information on both sides of the interactive terminal may be effectively reduced, thereby improving interaction efficiency of the multimedia picture information on both sides of the interactive terminal, and resolving an existing technical problem of relatively high information interaction costs and relatively low information interaction efficiency of the method for generating the high-resolution picture and the device for generating the high-resolution picture.

Figure 1A:
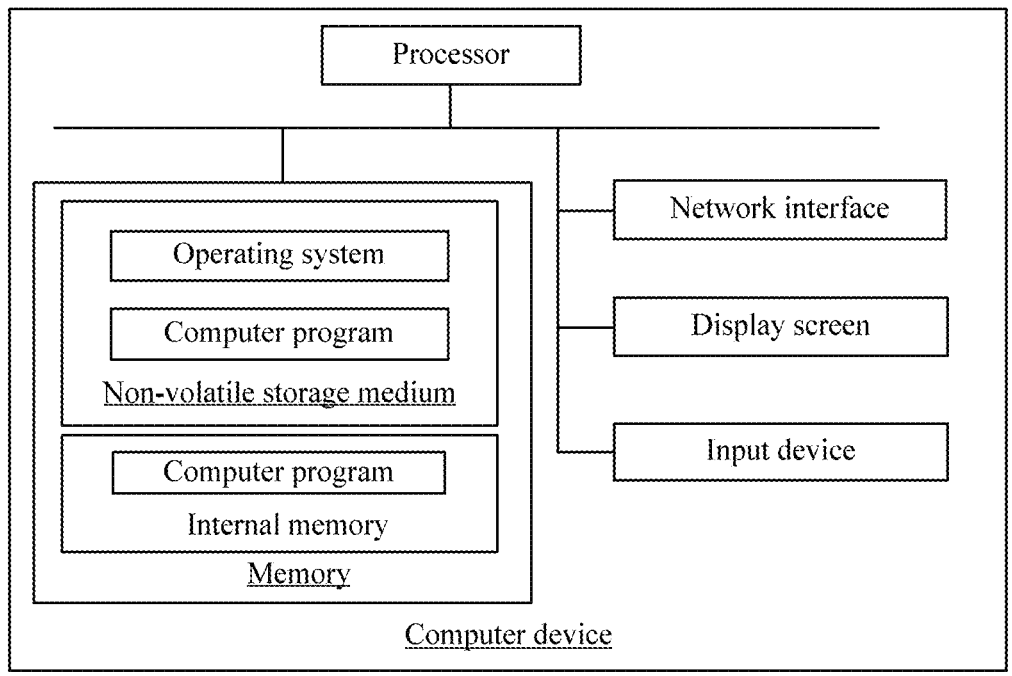
FIG. 1A is an internal structure diagram of a computer device of a method for generating a high-resolution picture according to this application.

In one embodiment, as shown in FIG. 1A, FIG. 1A is an internal structure diagram of a computer device according to an embodiment. The computer device may specifically be a terminal, the terminal including a processor, a memory, a network interface, an input device, and a display screen that are connected through a system bus. The memory includes a non-volatile storage medium and an internal memory. The non-volatile storage medium of the computer device stores an operating system and may further store a computer program, the computer program, when executed by the processor, causing the processor to implement a method for generating a high-resolution picture. The internal memory may also store a computer program, the computer program, when executed by the processor, causing the processor to perform the method for generating a high-resolution picture. The display screen of the computer device may be a liquid crystal display screen or an electronic ink display screen. The input device of the computer device may be a touch layer covering the display screen, or may be a key, a trackball or a touch pad disposed on a housing of the computer device, and may further be an external keyboard, a touch pad, a mouse, or the like.

Figure 1B:
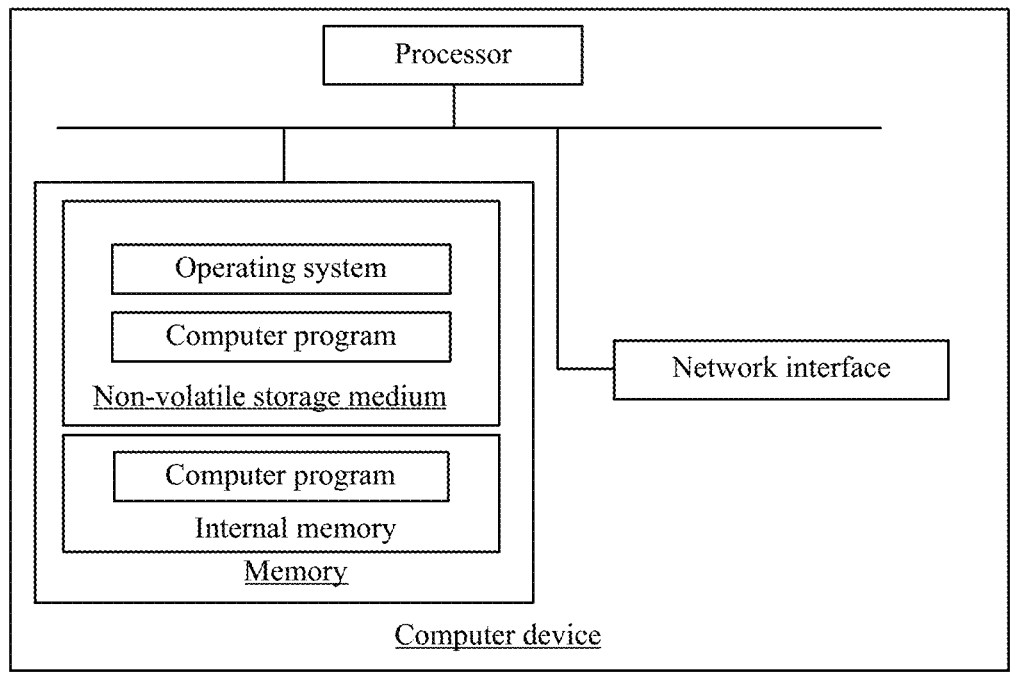
FIG. 1B is another internal structure diagram of a computer device of a method for generating a high-resolution picture according to this application.

In one embodiment, as shown in FIG. 1B, FIG. 1B is an internal structure diagram of a computer device according to an embodiment. The computer device may specifically be a server, the server including a processor, a memory, and a network interface that are connected through a system bus. The memory includes a non-volatile storage medium and an internal memory. The non-volatile storage medium of the computer device may store an operating system, a database, and computer-readable instructions. The computer-readable instructions, when executed, may cause the processor to perform a method for generating a high-resolution picture. The database is configured to store data, for example, store a deep neural network model. The processor of the server is configured to provide computing and control capabilities to support operation of the entire server. The network interface of the server is configured to communicate with an external terminal through a network connection, for example, configured to send a converted high-resolution picture to the terminal. The structure shown in FIG. 1A or FIG. 1B is merely a block diagram of a part of the structure related to the scheme of this application, and does not constitute a limitation on a terminal or a server to which the scheme of this application is applied. Specifically, the server may include more or fewer components than that shown in the figure, or combine some components, or have different component arrangements. A person skilled in the art may understand that the structure shown in FIG. 1A or FIG. 1B is merely a block diagram of a part of the structure related to the scheme of this application, and does not constitute a limitation on a server to which the scheme of this application is applied. Specifically, the server may include more or fewer components than that shown in the figure, or some combined components, or have different component arrangements.

FIG. 1 is a flowchart of an embodiment of a method for generating a high-resolution picture according to this application. The method for generating a high-resolution picture in this embodiment may be implemented by using the foregoing terminal or server. The method for generating a high-resolution picture in this embodiment includes the following steps.

Step S101: Acquire at least one deep neural network model, the deep neural network model being generated by a model generating device according to a corresponding high-resolution picture, a picture conversion algorithm, and a deep neural network framework.

Step S102: Acquire a low-resolution picture, the low-resolution picture being generated by a picture generating device according to the corresponding high-resolution picture and the picture conversion algorithm.

Step S103: Determine a corresponding deep neural network model according to the low-resolution picture.

Step S104: Convert the low-resolution picture into the high-resolution picture through the deep neural network model.

The process for generating the high-resolution picture of the method for generating a high-resolution picture of this embodiment is described in detail below.

In step S101, a device (an electronic device) for generating a high-resolution picture acquires at least one deep neural network model from a model generating device.

The model generating device herein may be a background server or a user terminal for generating a deep neural network model.

The deep neural network model herein is a machine learning model for quickly converting a corresponding low-resolution picture into a high-resolution picture. The machine learning model learns conversion data of a large number of low-resolution pictures and high-resolution pictures to generate a general algorithm for converting the low-resolution picture into the high-resolution picture.

The deep neural network model may be generated according to a corresponding high-resolution picture, a picture conversion algorithm, and a deep neural network framework. For the high-resolution pictures, a picture type to which the deep neural network may adapt may be set, for example, a close-up picture or a distant picture of a person. The picture conversion algorithm refers to a conversion algorithm for converting the high-resolution picture into the low-resolution picture, for example, a picture compression algorithm, a picture segmentation algorithm, and the like. The deep neural network framework refers to a preset structure of the deep neural network model, for example, a structure such as an input convolution layer and an output convolution layer. The deep neural network framework and parameters of the corresponding deep neural network model constitute a corresponding deep neural network model.

Since the deep neural network model is related to the high-resolution picture, the picture conversion algorithm, and the deep neural network framework, the device for generating a high-resolution picture may simultaneously acquire a plurality of different deep neural network models, to generate the high-resolution picture of different parameters.

The foregoing deep neural network model may be generated in advance by a model generating device, thereby effectively improving conversion efficiency of converting the high-resolution picture in real-time by the device for generating a high-resolution picture. The device for generating a high-resolution picture may be disposed in the model generating device, or may be disposed on other mobile or fixed devices. The subsequent device for generating a high-resolution picture may acquire a deep neural network model from the model generating device.

In step S102, the device for generating a high-resolution picture acquires a low-resolution picture from a picture generating device.

The picture generating device herein may be a background server or a user terminal for generating the low-resolution picture.

The low-resolution picture is generated by a picture generating device according to a corresponding high-resolution picture and the picture conversion algorithm. In order to reduce a picture information storage amount and a picture information transmission amount of the picture generating device, the picture generating device processes, according to the picture conversion algorithm, the high-resolution picture to be transmitted, to generate a corresponding low-resolution picture.

The high-resolution picture herein is the same as the high-resolution picture of the deep neural network model generated in step S101, and the picture conversion algorithm herein is also the same as the picture conversion algorithm of the deep neural network model generated in step S101. In this way, the device for generating a high-resolution picture may perform, according to the deep neural network acquired in step S101, high-resolution picture conversion on the low-resolution picture acquired in this step.

The foregoing low-resolution picture is generated by a picture generating device, and the device for generating a high-resolution picture may be disposed in the picture generating device, to reduce the picture information storage amount of the picture generating device through the low-resolution picture. The device for generating a high-resolution picture may also be disposed on other mobile or fixed devices, to reduce, through the low-resolution picture, an amount of picture information transmitted by the picture generating device to a device in which the device for generating a high-resolution picture is located.

In step S103, the device for generating a high-resolution picture determines, according to the low-resolution picture acquired in step S102, a deep neural network model corresponding to the low-resolution picture from a plurality of deep neural network models acquired in step S101.

Specifically, the deep neural network models may use the high-resolution picture or the picture conversion algorithm to classify pictures applicable to each deep neural network model when generating the plurality of deep neural network models. In addition, the picture generating device may also use the corresponding high-resolution picture or picture conversion algorithm to classify the corresponding low-resolution picture when generating a low-resolution picture. Therefore, if a type of a high-resolution picture corresponding to a low-resolution picture is the same as a type of a high-resolution picture corresponding to a deep neural network model, the low-resolution picture may be considered to correspond to the deep neural network model.

Figure 2:
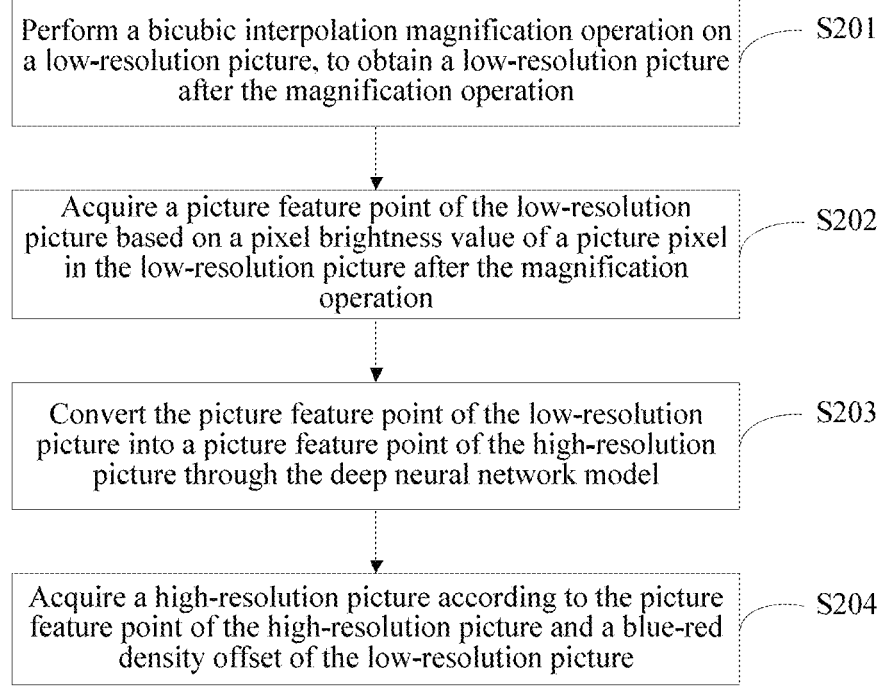
FIG. 2 is a flowchart of step S104 of an embodiment of a method for generating a high-resolution picture according to this application.

In step S104, the device for generating a high-resolution picture converts the low-resolution picture acquired in step S102 into a corresponding high-resolution picture through the deep neural network model acquired in step S103. For details, reference is made to FIG. 2. FIG. 2 is a flowchart of step S104 of an embodiment of a method for generating a high-resolution picture according to this application. Step S104 includes the following steps.

Step S201: A device for generating a high-resolution picture performs a bicubic interpolation magnification operation on a low-resolution picture, to obtain a low-resolution picture after the magnification operation, so that the low-resolution picture has the same quantity of picture feature points as the high-resolution picture.

Step S202: The device for generating a high-resolution picture acquires a picture feature point of the low-resolution picture based on a pixel brightness value of a picture pixel in the low-resolution picture after the magnification operation.

Since human eyes are more sensitive to the pixel brightness value and have greater tolerance for color, only the pixel brightness value of the picture pixel of a low-resolution sub-picture is used as the picture feature point of the low-resolution sub-picture, to simplify the deep neural network model.

Step S203: The device for generating a high-resolution picture converts the picture feature point of the low-resolution picture into a picture feature point of the high-resolution picture through the deep neural network model. The picture feature point of the high-resolution picture herein is also a pixel brightness value of a picture pixel in the high-resolution picture.

Step S204: The device for generating a high-resolution picture synthesizes picture pixels of the high-resolution picture according to the picture feature point of the high-resolution picture acquired in step S203 and a blue-red density offset of the low-resolution picture, to acquire the high-resolution picture corresponding to the low-resolution picture.

In this way, the device for generating a high-resolution picture may implement conversion and restoration of the high-resolution picture by converting the high resolution picture through two steps of only finding the deep neural network model and using the deep neural network model to convert the resolution picture, so that conversion efficiency of the high-resolution picture of the device for generating a high-resolution picture and information interaction efficiency of the device for generating a high-resolution picture are greatly improved.

In this way, the process for generating the high-resolution picture of the method for generating a high-resolution picture of this embodiment is completed.

According to the method for generating the high-resolution picture of this embodiment, accuracy of converting and restoring a compressed low-resolution picture to a high-resolution picture is improved by creating a deep neural network model with a non-linear conversion convolution layer, so that interaction costs of multimedia picture information on both sides of an interactive terminal, and interaction efficiency of the multimedia picture information on both sides of the interactive terminal is improved.

Figure 3:
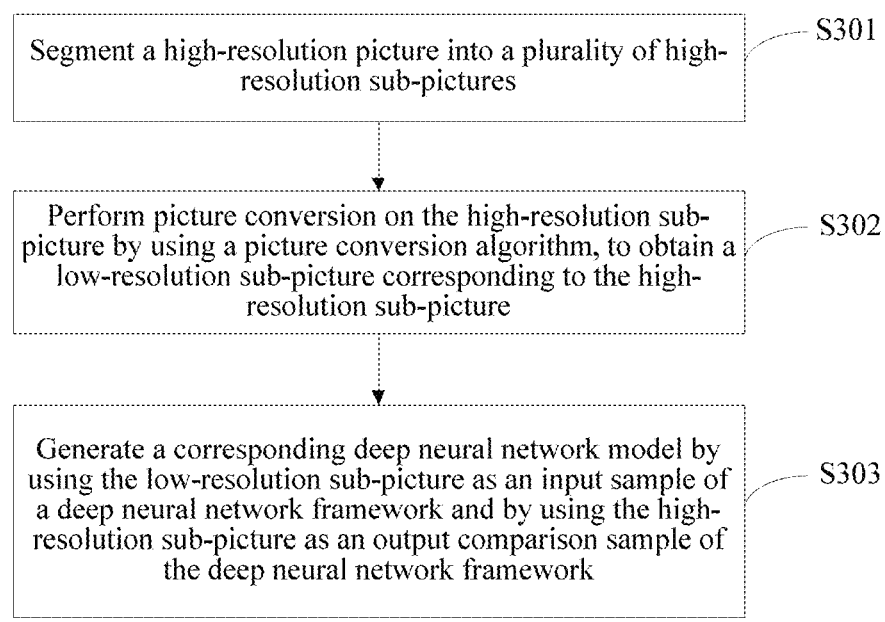
FIG. 3 is a flowchart of creating a deep neural network model in an embodiment of a method for generating a high-resolution picture according to this application.

FIG. 3 is a flowchart of creating a deep neural network model in an embodiment of a method for generating a high-resolution picture according to this application. In the method for generating a high-resolution picture of this embodiment, a model generating device generates a deep neural network model according to a high-resolution picture, a picture conversion algorithm, and a deep neural network framework. The method specifically includes the following steps.

Step S301: Segment a high-resolution picture into a plurality of high-resolution sub-pictures.

Step S302: Perform picture conversion on the high-resolution sub-picture by using a picture conversion algorithm, to obtain a low-resolution sub-picture corresponding to the high-resolution sub-picture.

Step S303: Generate a corresponding deep neural network model by using the low-resolution sub-picture as an input sample of a deep neural network framework and by using the high-resolution sub-picture as an output comparison sample of the deep neural network framework.

A specific process of each step of generating the foregoing deep neural network model is described in detail below.

In step S301, the model generating device performs a segmentation operation on the high-resolution picture used for machine learning, for example, average segmentation of 4 equal parts or 9 equal parts, to acquire a plurality of high-resolution sub-pictures.

In step S302, the model generating device performs picture conversion on the high-resolution sub-picture by using a preset picture conversion algorithm, to obtain a low-resolution sub-picture corresponding to the high-resolution sub-picture. The step specifically includes:

performing, according to a preset scaling ratio by the model generating device, a picture scaling-down operation on the high-resolution sub-picture acquired in step S301, for example, reducing each high-resolution sub-picture to a quarter of original dimensions; and performing, by the model generating device, using a preset compression algorithm, a picture compression operation on the high-resolution sub-picture after the picture scaling-down operation, for example, reducing quality of a picture from 100% to 85%.

In this way, the low-resolution sub-picture corresponding to the high-resolution sub-picture may be obtained.

Figure 4:
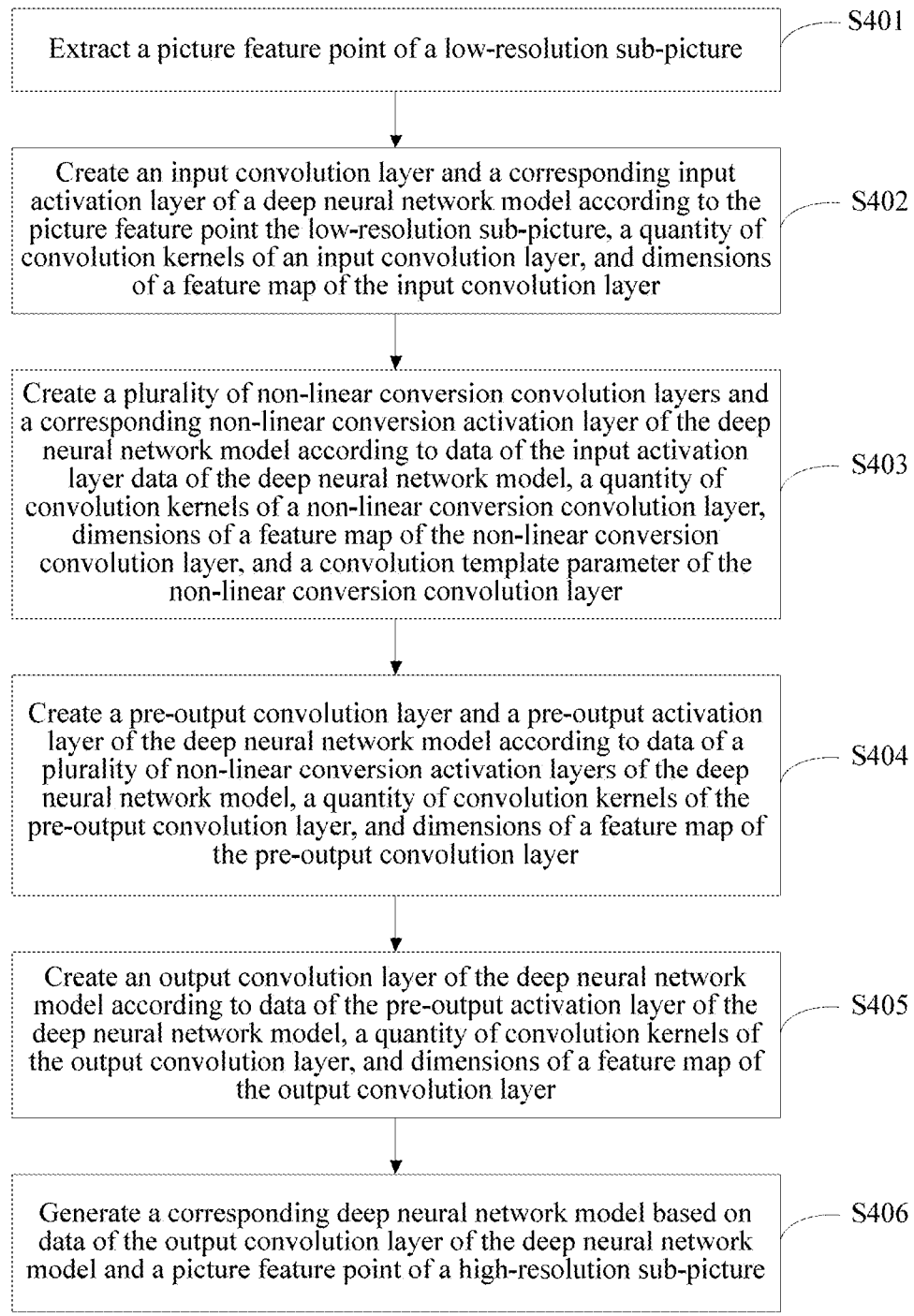
FIG. 4 is a detailed flowchart of creating a deep neural network model in an embodiment of a method for generating a high-resolution picture according to this application.

In step S303, the model generating device generates a corresponding deep neural network model by using the low-resolution sub-picture acquired in step S302 as an input sample of the deep neural network framework and by using the high-resolution sub-picture acquired in step S301 as an output comparison sample of the deep neural network framework. For details, reference is made to FIG. 4. FIG. 4 is a detailed flowchart of creating a deep neural network model in an embodiment of a method for generating a high-resolution picture according to this application. Step S303 includes the following steps.

Step S401: A model generating device extracts a picture feature point of a low-resolution sub-picture. Specifically, the model generating device may first perform a bicubic interpolation magnification operation on the low-resolution sub-picture, to obtain a low-resolution sub-picture after the magnification operation. In this way, it may be ensured that a quantity of picture feature points of the low-resolution sub-picture is consistent with a quantity of picture feature points of a high-resolution sub-picture.

The model generating device then converts the low-resolution sub-picture after the magnification operation from an RGB color space to a YCbCr color space, and acquires a pixel brightness value of a picture pixel of the low-resolution sub-picture in the YCbCr color space as a picture feature point of the low-resolution sub-picture.

The low-resolution sub-picture in the YCbCr color space is defined using the pixel brightness value (Y), a blue density offset value (Cb), and a red density offset value (Cr) of the picture pixel. Since human eyes are more sensitive to the pixel brightness value and have greater tolerance for color, only the pixel brightness value of the picture pixel of a low-resolution sub-picture is used as the picture feature point of the low-resolution sub-picture, to reduce a calculation amount of the deep neural network model without affecting a picture conversion result.

Similarly, the model generating device may acquire the pixel brightness value of the picture pixel in the high-resolution sub-picture in the YCbCr color space as the picture feature point of the high-resolution sub-picture.

Step S402: The model generating device creates an input convolution layer and a corresponding input activation layer of a deep neural network model according to the picture feature point the low-resolution sub-picture acquired in step S401, a quantity of convolution kernels of an input convolution layer, and dimensions of a feature map of the input convolution layer.

The picture feature point of the low-resolution sub-picture herein is the input of the input convolution layer. The quantity of convolution kernels of the input convolution layer is used to indicate a quantity of feature extraction modes for feature extraction from the picture feature point of the low-resolution sub-picture. The dimensions of the feature map of the input convolution layer are used to adjust complexity of the deep neural network model. A larger quantity of convolution kernels of the input convolution layer leads to larger dimensions of the feature map of the input convolution layer. Higher complexity of the deep neural network model leads to a more accurate picture conversion result.

In order to improve accuracy of the picture conversion result, a relatively large quantity of feature extraction modes may be set, and therefore, the quantity of convolution kernels of the input convolution layer is set to a relatively large value, for example, set to 14-18, and the like.

For example, if the input feature point of a low-resolution sub-picture is a feature point matrix of 32*32, then a feature (that is, the quantity of convolution kernels of the input convolution layer is 3) of the picture point may be extracted using a red pixel brightness value, a blue pixel brightness value, and a green pixel brightness value. If a convolution template parameter of the input convolution layer is set to 5*5, then the dimensions of the feature map of the input convolution layer are 28*28, that is, a feature map of 28*28 may be obtained using a 5*5 parameter matrix to sequentially traverse a feature point matrix of 32*32. Therefore, obtained output data of the input convolution layer is 28*28*3.

In addition, non-linear processing further needs to be performed on the output data of the input convolution layer using the input activation layer, to ensure that the output of the input convolution layer is differentiable, thereby ensuring normal operation of parameter training of the subsequent deep neural network model.

Step S403: The model generating device creates a plurality of non-linear conversion convolution layers and a corresponding non-linear conversion activation layer of the deep neural network model according to output data of the input activation layer data of the deep neural network model acquired in step S402, a quantity of convolution kernels of a non-linear conversion convolution layer, dimensions of a feature map of the non-linear conversion convolution layer, and a convolution template parameter of the non-linear conversion convolution layer. For example, five non-linear conversion convolution layers and corresponding non-linear conversion activation layers are disposed, and a plurality of non-linear conversion convolution layers and corresponding non-linear conversion activation layers are connected in sequence. For example, an output of a non-linear conversion convolution layer A1 is connected to an input of a non-linear conversion activation layer B1 is connected, an output of the non-linear conversion activation layer B1 is connected to an input of a non-linear conversion convolution layer A2, an output of the non-linear conversion convolution layer A2 is connected to an input of a non-linear conversion activation layer B2, and so on.

The output data of the input activation layer of the deep neural network model herein is an input of the first non-linear conversion convolution layer. The quantity of convolution kernels of the non-linear conversion convolution layer is used to indicate a quantity of feature extraction modes for feature extraction from the output data of the input activation layer, and the dimensions of the feature map of the non-linear conversion convolution layer and the convolution template parameter of the non-linear conversion convolution layer are used to adjust the complexity of the deep neural network model.

In order to reduce the calculation amount of the deep neural network model herein, a relatively small quantity of feature extraction modes may be set, and therefore, the quantity of convolution kernels of the non-linear conversion convolution layer is set to a relatively small value, for example, set to 4-6, and the like. That is, the quantity of convolution kernels of the input convolution layer is greater than the quantity of convolution kernels of the non-linear conversion convolution layer.

Specifically, the model generating device sets convolution template parameters of all non-linear conversion convolution layers by alternately using a first parameter matrix and a second parameter matrix. Preferably, the first parameter matrix is 1*1, and the second parameter matrix is 3*3. For example, a convolution template parameter of the non-linear conversion convolution layer A1 is 1*1, a convolution template parameter of the non-linear conversion convolution layer A2 is 3*3, a convolution template parameter of the non-linear conversion convolution layer A3 is 1*1, and so on. In this way, a non-linear characteristic of the deep neural network model may be effectively improved, and variations of dimensions of the feature map of the non-linear conversion convolution layer may be reduced, thereby further reducing the calculation amount of the deep neural network model, so that convergence of the deep neural network model during parameter training of the subsequent deep neural network model is ensured, and overfitting is not easy to occur.

In addition, non-linear processing further needs to be performed on the output data of the non-linear conversion convolution layer using the non-linear conversion activation layer, to ensure that the output of the input convolution layer is differentiable, thereby ensuring normal operation of parameter training of the subsequent deep neural network model.

Step S404: The model generating device creates a pre-output convolution layer and a pre-output activation layer of the deep neural network model according to output data of the last one non-linear conversion activation layer of the deep neural network model acquired in step S403, a quantity of convolution kernels of the pre-output convolution layer, and dimensions of a feature map of the pre-output convolution layer.

The output data of the last one non-linear conversion activation layer of the deep neural network model is an input of the input convolution layer, the quantity of convolution kernels of the pre-output convolution layer is used to indicate a quantity of feature extraction modes for feature extraction from the output data of the last one non-linear conversion activation layer, and the dimensions of the feature map of the input convolution layer are used to adjust the complexity of the deep neural network model.

In order to improve accuracy of the picture conversion result, the quantity of convolution kernels of the pre-output convolution layer is equal to the quantity of convolution kernels of the input convolution layer, for example, both are set to 14-18, and the like. In this way, after non-linear conversion is performed on the non-linear conversion activation layer, the same feature extraction mode may be used to generate a high-resolution sub-picture.

In addition, non-linear processing further needs to be performed on the output data of the corresponding pre-output convolution layer using the pre-output activation layer, to ensure that the output of the pre-output convolution layer is differentiable, thereby ensuring normal operation of parameter training of the subsequent deep neural network model.

Step S405: The model generating device creates an output convolution layer of the deep neural network model according to data of the pre-output activation layer of the deep neural network model acquired in step S404, a quantity of convolution kernels of the output convolution layer, and dimensions of a feature map of the output convolution layer.

The output data of the pre-output activation layer of the deep neural network model is an input of the output convolution layer, the quantity of convolution kernels of the output convolution layer is used to indicate a quantity of feature extraction modes for feature extraction from the output data of the pre-output activation layer, and the dimensions of the feature map of the pre-output activation layer are used to adjust the complexity of the deep neural network model.

In order to ensure the accuracy of the picture conversion result, the dimensions of the feature map of the output convolution layer are the same as the dimensions of the feature map of the input convolution layer. In this way, the same quantity of picture feature points may be output and compared with the output comparison sample (the picture feature point of the high-resolution sub-picture).

Step S406: The model generating device generates a corresponding deep neural network model based on data of the output convolution layer of the deep neural network model acquired in step S405 and a picture feature point of a high-resolution sub-picture.

The output data of the output convolution layer of the deep neural network model is compared by using the picture feature point of the high-resolution sub-picture, and the parameter of the deep neural network model is corrected according to a comparison result, so that a difference between the output data of the output convolution layer of the deep neural network model and the picture feature point of the high-resolution sub-picture is less than a set value. In this way, the corresponding deep neural network model may be determined.

Specifically, in order to accelerate a machine training speed of the deep neural network model, the model generating device may use the PReLU (parametric rectified linear unit) algorithm in advance to perform a parameter (such as a convolution template parameter w and a bias parameter b) initialization operation on the deep neural network model, so that the deep neural network model converges more rapidly.

In addition, the model generating device may further use an adaptive moment (Adam) estimation algorithm to perform an iterative operation on the deep neural network model, thereby acquiring a parameter in the deep neural network model rapidly and accurately.

In this way, the process of generating the deep neural network model of this embodiment is completed.

The deep neural network model of this embodiment effectively reduces the calculation amount of the deep neural network model by disposing a plurality of non-linear conversion convolution layers with a small quantity of convolution kernels. In addition, the quantity of convolution kernels of the pre-output convolution layer is equal to the quantity of convolution kernels of the input convolution layer, and the dimensions of the feature map of the output convolution layer is the same as the dimensions of the input convolution layer, so that the operation accuracy of the deep neural network model is further improved.

In one embodiment, a computer device is further provided. An internal structure of the computer device may be shown in FIG. 1A or FIG. 1B. The computer device includes a device for generating a high-resolution picture. The device for generating a high-resolution picture includes modules, and each module may be implemented in whole or in part by using software, hardware or a combination thereof.

Figure 5:
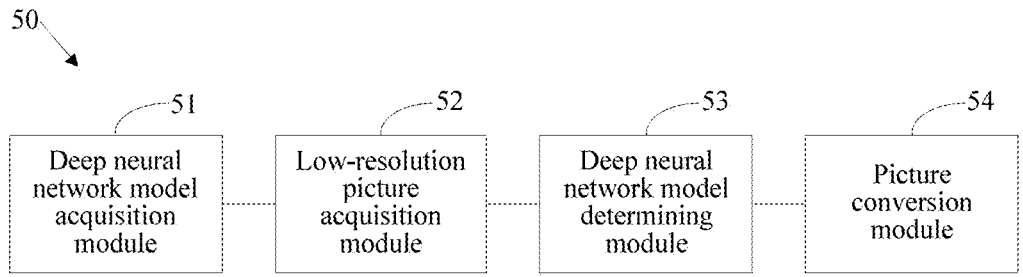
FIG. 5 is a schematic structural diagram of an embodiment of a device for generating a high-resolution picture according to this application.

This application further provides a device for generating a high-resolution picture. FIG. 5 is a schematic structural diagram of an embodiment of a device for generating a high-resolution picture according to this application. The device for generating a high-resolution picture of this embodiment may be implemented by using the foregoing method for generating a high-resolution picture. A device 50 for generating a high-resolution picture of this embodiment includes a deep neural network model acquisition module 51, a low-resolution picture acquisition module 52, a deep neural network model determining module 53, and a picture conversion module 54.

The deep neural network model acquisition module 51 is configured to acquire at least one deep neural network model, the deep neural network model being generated by other terminals according to a corresponding high-resolution picture, a picture conversion algorithm, and a deep neural network framework. The low-resolution picture acquisition module 52 is configured to acquire a low-resolution picture, the low-resolution picture being generated by other terminals according to the corresponding high-resolution picture and the picture conversion algorithm. The deep neural network model determining module 53 is configured to determine a corresponding deep neural network model according to the low-resolution picture. The picture conversion module 54 is configured to convert the low-resolution picture into a high-resolution picture by using the deep neural network model.

Figure 6:
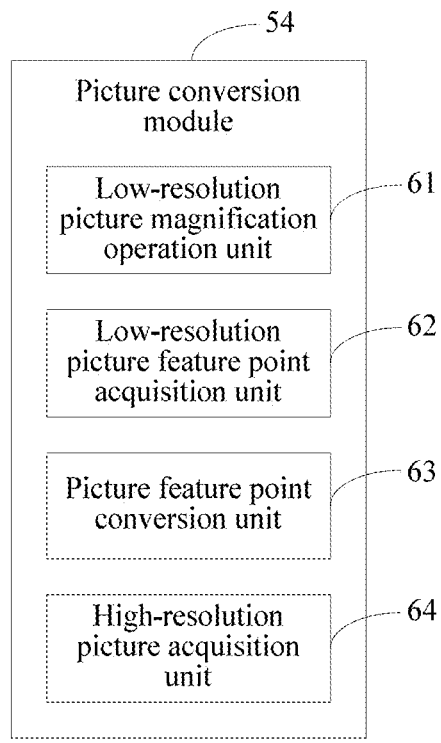
FIG. 6 is a schematic structural diagram of a picture conversion module of an embodiment of a device for generating a high-resolution picture according to this application.

FIG. 6 is a schematic structural diagram of a picture conversion module of an embodiment of a device for generating a high-resolution picture according to this application. The picture conversion module 54 includes a low-resolution picture magnification operation unit 61, a low-resolution picture feature point acquisition unit 62, a picture feature point conversion unit 63, and a high-resolution picture acquisition unit 64.

The low-resolution picture magnification operation unit 61 is configured to perform a bicubic interpolation magnification operation on the low-resolution picture, to obtain a low-resolution picture after the magnification operation. The low-resolution picture feature point acquisition unit 62 is configured to acquire a picture feature point of the low-resolution picture based on a pixel brightness value of a picture pixel in the low-resolution picture after the magnification operation. The picture feature point conversion unit 63 is configured to convert the picture feature point of the low-resolution picture into a picture feature point of a high-resolution picture through a deep neural network model. The high-resolution picture acquisition unit 64 is configured to acquire a high-resolution picture according to the picture feature point of the high-resolution picture and a blue-red density offset of the low-resolution picture.

When a device 50 for generating a high-resolution picture of this embodiment is used, first a deep neural network model acquisition module 51 acquires at least one deep neural network model from a model generating device.

The model generating device herein may be a background server or a user terminal for generating a deep neural network model.

The deep neural network model herein is a machine learning model for quickly converting a corresponding low-resolution picture into a high-resolution picture. The machine learning model learns conversion data of a large number of low-resolution pictures and high-resolution pictures to generate a general algorithm for converting the low-resolution picture into the high-resolution picture.

The deep neural network model may be generated according to a corresponding high-resolution picture, a picture conversion algorithm, and a deep neural network framework. For the high-resolution pictures, a picture type to which the deep neural network may adapt may be set, for example, a close-up picture or a distant picture of a person. The picture conversion algorithm refers to a conversion algorithm for converting the high-resolution picture into the low-resolution picture, for example, a picture compression algorithm, a picture segmentation algorithm, and the like. The deep neural network framework refers to a preset structure of the deep neural network model, for example, a structure such as an input convolution layer and an output convolution layer. The deep neural network framework and parameters of the corresponding deep neural network model constitute a corresponding deep neural network model.

Since the deep neural network model is related to the high-resolution picture, the picture conversion algorithm, and the deep neural network framework, the device for generating a high-resolution picture may simultaneously acquire a plurality of different deep neural network models, to generate the high-resolution picture of different parameters.

The foregoing deep neural network model may be generated in advance by a model generating device, thereby effectively improving conversion efficiency of converting the high-resolution picture in real-time by the device for generating a high-resolution picture. The device for generating a high-resolution picture may be disposed in the model generating device, or may be disposed on other mobile or fixed devices. The subsequent device for generating a high-resolution picture may acquire a deep neural network model from the model generating device.

Subsequently, the low-resolution picture acquisition module 52 acquires a low-resolution picture from a picture generating device.

The picture generating device herein may be a background server or a user terminal for generating the low-resolution picture.

The low-resolution picture is generated by a picture generating device according to a corresponding high-resolution picture and the picture conversion algorithm. In order to reduce a picture information storage amount and a picture information transmission amount of the picture generating device, the picture generating device processes, according to the picture conversion algorithm, the high-resolution picture to be transmitted, to generate a corresponding low-resolution picture.

The high-resolution picture herein is the same as the generated high-resolution picture of the deep neural network model, and the picture conversion algorithm herein is also the same as the generated picture conversion algorithm of the deep neural network model. In this way, the device for generating a high-resolution picture may perform high-resolution picture conversion on the low-resolution picture according to the deep neural network acquired by the deep neural network model acquisition module.

The foregoing low-resolution picture is generated by a picture generating device, and the device for generating a high-resolution picture may be disposed in the picture generating device, to reduce the picture information storage amount of the picture generating device through the low-resolution picture. The device for generating a high-resolution picture may also be disposed on other mobile or fixed devices, to reduce, through the low-resolution picture, an amount of picture information transmitted by the picture generating device to a device in which the device for generating a high-resolution picture is located.

Then the deep neural network model determining module 53 determines, according to the low-resolution picture acquired by the low-resolution image acquisition module 52, a deep neural network model corresponding to the low-resolution picture from a plurality of deep neural network models acquired by the deep neural network model acquisition module.

Specifically, the deep neural network models may use the high-resolution picture or the picture conversion algorithm to classify pictures applicable to each deep neural network model when generating the plurality of deep neural network models. In addition, the picture generating device may also use the corresponding high-resolution picture or picture conversion algorithm to classify the corresponding low-resolution picture when generating a low-resolution picture. Therefore, if a type of a high-resolution picture corresponding to a low-resolution picture is the same as a type of a high-resolution picture corresponding to a deep neural network model, the low-resolution picture may be considered to correspond to the deep neural network model.

Finally, the picture conversion module 54 converts, by using the deep neural network model acquired by the deep neural network model determining module 53, the low-resolution picture acquired by the low-resolution picture acquisition module 52 into a corresponding high-resolution picture. A specific process includes the following steps.

The low-resolution picture magnification operation unit 61 of the picture conversion module 54 performs a bicubic interpolation magnification operation on a low-resolution picture, to obtain a low-resolution picture after the magnification operation, so that the low-resolution picture has the same quantity of picture feature points as the high-resolution picture.

The low-resolution picture feature point acquisition unit 62 of the picture conversion module 54 acquires a picture feature point of the low-resolution picture based on a pixel brightness value of a picture pixel in the low-resolution picture after the magnification operation.

Since human eyes are more sensitive to the pixel brightness value and have greater tolerance for color, only the pixel brightness value of the picture pixel of a low-resolution sub-picture is used as the picture feature point of the low-resolution sub-picture, to simplify the deep neural network model.

The picture feature point conversion unit 63 of the picture conversion module 54 converts the picture feature point of the low-resolution picture into a picture feature point of the high-resolution picture through the deep neural network model. The picture feature point of the high-resolution picture herein is also a pixel brightness value of a picture pixel in the high-resolution picture.

The high-resolution picture acquisition unit 64 of the picture conversion module 54 synthesizes picture pixels of the high-resolution picture according to the picture feature point of the high-resolution picture acquired by the picture feature point conversion unit 63 and a blue-red density offset of the low-resolution picture, to acquire the high-resolution picture corresponding to the low-resolution picture.

In this way, the device 50 for generating a high-resolution picture may implement conversion and restoration of the high-resolution picture by converting the resolution picture through two steps of only finding the deep neural network model and using the deep neural network model to convert the resolution picture, so that conversion efficiency of the high-resolution picture of the device for generating a high-resolution picture and information interaction efficiency of the device for generating a high-resolution picture are greatly improved.

In this way, the process for generating the high-resolution picture of the device 50 for generating a high-resolution picture of this embodiment is completed.

According to the device for generating the high-resolution picture of this embodiment, accuracy of converting and restoring a compressed low-resolution picture to a high-resolution picture is improved by creating a deep neural network model with a non-linear conversion convolution layer, so that interaction costs of multimedia picture information on both sides of an interactive terminal, and interaction efficiency of the multimedia picture information on both sides of the interactive terminal is improved.

Figure 7:
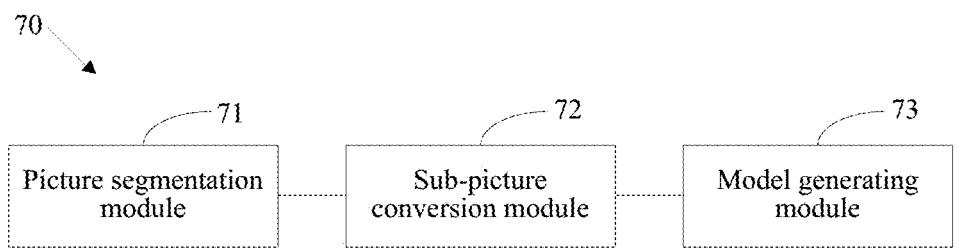
FIG. 7 is a schematic structural diagram of a corresponding model generating device in an embodiment of a device for generating a high-resolution picture according to this application.

FIG. 7 is a schematic structural diagram of a corresponding model generating device in an embodiment of a device for generating a high-resolution picture according to this application. The model generating device 70 includes a picture segmentation module 71, a sub-picture conversion module 72, and a model generating module 73.

The picture segmentation module 71 is configured to divide a high-resolution picture into a plurality of high-resolution sub-pictures. The sub-picture conversion module 72 is configured to convert the high-resolution sub-picture using a picture conversion algorithm, to obtain a low-resolution sub-picture corresponding to the high-resolution sub-picture. The model generating module 73 is configured to generate a corresponding deep neural network model by using the low-resolution sub-picture as an input sample of a deep neural network framework and by using the high-resolution sub-picture as an output contrast sample of the deep neural network framework.

Figure 8:
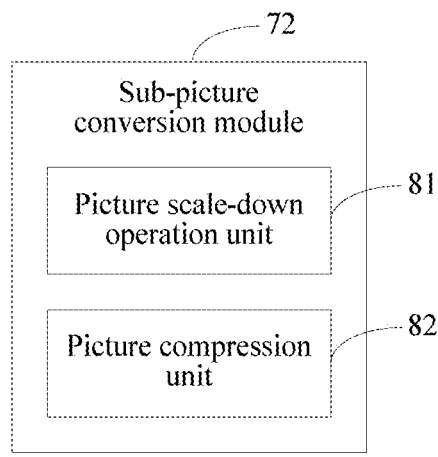
FIG. 8 is a schematic structural diagram of a sub-picture conversion module of a corresponding model generating device in an embodiment of a device for generating a high-resolution picture according to this application.

FIG. 8 is a schematic structural diagram of a sub-picture conversion module of a corresponding model generating device in an embodiment of a device for generating a high-resolution picture according to this application. The sub-picture conversion module 72 includes a picture scale-down operation unit 81 and a picture compression unit 82.

The picture scale-down operation unit 81 is configured to perform a picture scaling-down operation on a high-resolution sub-picture according to a preset scaling ratio. The picture compression unit 82 is configured to perform, using a preset compression algorithm, a picture compression operation on the high-resolution sub-picture after the picture scaling-down operation, to obtain a low-resolution sub-picture corresponding to the high-resolution sub-picture.

Figure 9:
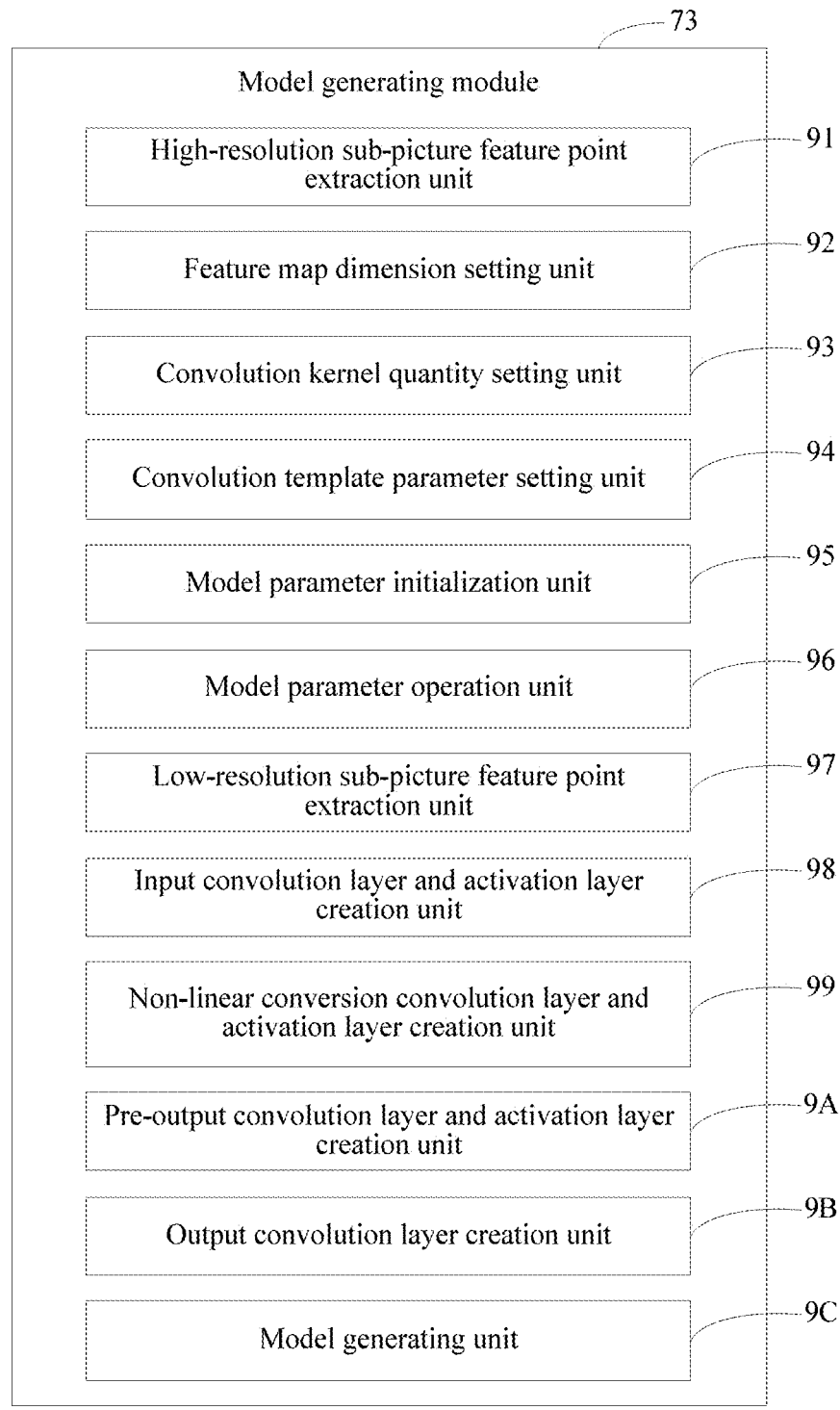
FIG. 9 is a schematic structural diagram of a model generating module of a corresponding model generating device in an embodiment of a device for generating a high-resolution picture according to this application.

FIG. 9 is a schematic structural diagram of a model generating module of a corresponding model generating device in an embodiment of a device for generating a high-resolution picture according to this application.

The model generating module 73 includes a high-resolution sub-picture feature point extraction unit 91, a feature map dimension setting unit 92, a convolution kernel quantity setting unit 93, a convolution template parameter setting unit 94, a model parameter initialization unit 95, a model parameter operation unit 96, a low-resolution sub-picture feature point extraction unit 97, an input convolution layer and activation layer creation unit 98, a non-linear conversion convolution layer and activation layer creation unit 99, a pre-output convolution layer and activation layer creation unit 9A, an output convolution layer creation unit 9B, and a model generating unit 9C.

The high-resolution sub-picture feature point extraction unit 91 is configured to acquire the picture feature point of the high-resolution sub-picture based on a pixel brightness value of a picture pixel in the high-resolution sub-picture. The feature map dimension setting unit 92 is configured to set dimensions of a feature map of an input convolution layer and dimensions of a feature map of an output convolution layer. The convolution kernel quantity setting unit 93 is configured to set a quantity of convolution kernels of the input convolution layer, a quantity of convolution kernels of a pre-output convolution layer, and a quantity of convolution kernels of a non-linear conversion convolution layer. The convolution template parameter setting unit 94 is configured to set convolution template parameters of all non-linear conversion convolution layers by alternately using a parameter matrix of 1*1 and a parameter matrix of 3*3. The model parameter initialization unit 95 is configured to perform a parameter initialization operation on a deep neural network model by using a parametric rectified linear unit (PReLU) algorithm. The model parameter operation unit 96 is configured to perform an iterative operation on the deep neural network model by using an adaptive moment (Adam) estimation algorithm, to obtain a parameter in the deep neural network model. The low-resolution sub-picture feature point extraction unit 97 is configured to extract a picture feature point of a low-resolution sub-picture. The input convolution layer and activation layer creation unit 98 is configured to create an input convolution layer and a corresponding input activation layer of the deep neural network model according to the picture feature point of the low-resolution sub-picture, a quantity of convolution kernels of an input convolution layer, and the dimensions of the feature map of the input convolution layer. The non-linear conversion convolution layer and activation layer creation unit 99 is configured to create a plurality of non-linear conversion convolution layers and a corresponding non-linear conversion activation layer of the deep neural network model according to data of the input activation layer data of the deep neural network model, a quantity of convolution kernels of the non-linear conversion convolution layer, dimensions of a feature map of the non-linear conversion convolution layer, and a convolution template parameter of the non-linear conversion convolution layer. The pre-output convolution layer and activation layer creation unit 9A is configured to create a pre-output convolution layer and a pre-output activation layer of the deep neural network model according to data of a plurality of non-linear conversion activation layers of the deep neural network model, a quantity of convolution kernels of the pre-output convolution layer, and dimensions of a feature map of the pre-output convolution layer. The output convolution layer creation unit 9B is configured to create an output convolution layer of the deep neural network model according to data of the pre-output activation layer of the deep neural network model, a quantity of convolution kernels of an output convolution layer, and dimensions of a feature map of an output convolution layer. The model generating unit 9C is configured to generate a corresponding deep neural network model based on data of the output convolution layer of the deep neural network model and the picture feature point of the high-resolution sub-picture.

Figure 10:
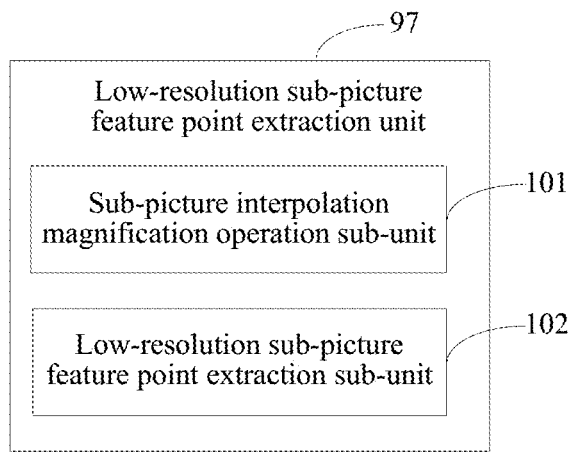
FIG. 10 is a schematic structural diagram of a low-resolution sub-picture feature point extraction unit of a model generating module of a corresponding model generating device in an embodiment of a device for generating a high-resolution picture according to this application.

FIG. 10 is a schematic structural diagram of a low-resolution sub-picture feature point extraction unit of a model generating module of a corresponding model generating device in an embodiment of a device for generating a high-resolution picture according to this application. A low-resolution sub-picture feature point extraction unit 97 includes a sub-picture interpolation magnification operation sub-unit 101 and a low-resolution sub-picture feature point extraction sub-unit 102.

The sub-picture interpolation magnification operation sub-unit 101 is configured to perform a bicubic interpolation magnification operation on the low-resolution sub-picture, to obtain a low-resolution sub-picture after the magnification operation. The low-resolution sub-picture feature point extraction sub-unit 102 is configured to acquire a picture feature point of the low-resolution sub-picture based on a pixel brightness value of a picture pixel in the low-resolution sub-picture after the magnification operation.

The process of generating a corresponding deep neural network model by a model generating device 70 of this embodiment includes the following operations.

First, a picture segmentation module 71 performs a segmentation operation on a high-resolution picture used for machine learning, for example, average segmentation of 4 equal parts or 9 equal parts, to acquire a plurality of high-resolution sub-pictures.

Then, a sub-picture conversion module 72 performs picture conversion on the high-resolution sub-picture by using a preset picture conversion algorithm, to obtain a low-resolution sub-picture corresponding to the high-resolution sub-picture. The process specifically includes the following operations.

A picture scale-down operation unit 81 of the sub-picture conversion module 72 performs, according to a preset scaling ratio, a picture scaling-down operation on the high-resolution sub-picture acquired by the picture segmentation module, for example, reducing each high-resolution sub-picture to a quarter of original dimensions, and the like.

A picture compression unit 82 of the sub-picture conversion module 72 performs, using a preset compression algorithm, a picture compression operation on the high-resolution sub-picture after the picture scaling-down operation, for example, reduces quality of a picture from 100% to 85%. In this way, the low-resolution sub-picture corresponding to the high-resolution sub-picture may be obtained.

Then, the model generating module 73 generates a corresponding deep neural network model by using the low-resolution sub-picture acquired by the sub-picture conversion module 72 as an input sample of a deep neural network framework and by using the high-resolution sub-picture acquired by the picture segmentation module 71 as an output comparison sample of the deep neural network framework. A specific process of creating the deep neural network model includes the following operations.

I. The low-resolution sub-picture feature point extraction unit 97 of the model generating module 73 extracts the picture feature point of the low-resolution sub-picture. Specifically, the sub-picture interpolation magnification operation sub-unit 101 of the low-resolution sub-picture feature point extraction unit 97 performs a bicubic interpolation magnification operation on the low-resolution sub-picture, to obtain a low-resolution sub-picture after the magnification operation. In this way, it may be ensured that a quantity of picture feature points of the low-resolution sub-picture is consistent with a quantity of picture feature points of a high-resolution sub-picture.

The low-resolution sub-picture feature point extraction sub-unit 102 of the low-resolution sub-picture feature point extraction unit 97 converts the low-resolution sub-picture after the magnification operation from an RGB color space to a YCbCr color space, and acquires a pixel brightness value of a picture pixel of the low-resolution sub-picture in the YCbCr color space as a picture feature point of the low-resolution sub-picture.

The low-resolution sub-picture in the YCbCr color space is defined using the pixel brightness value (Y), a blue density offset value (Cb), and a red density offset value (Cr) of the picture pixel. Since human eyes are more sensitive to the pixel brightness value and have greater tolerance for color, only the pixel brightness value of the picture pixel of a low-resolution sub-picture is used as the picture feature point of the low-resolution sub-picture, to reduce a calculation amount of the deep neural network model without affecting a picture conversion result.

Similarly, a high-resolution sub-picture feature point extraction unit 91 may acquire a pixel brightness value of a picture pixel in the high-resolution sub-picture in the YCbCr color space as the picture feature point of the high-resolution sub-picture.

II. An input convolution layer and activation layer creation unit 98 of the model generating module 73 is configured to create an input convolution layer and a corresponding input activation layer of the deep neural network model according to the picture feature point of the low-resolution sub-picture acquired by the low-resolution sub-picture feature point extraction unit 97, a quantity of convolution kernels of an input convolution layer, and the dimensions of the feature map of the input convolution layer.

The picture feature point of the low-resolution sub-picture herein is the input of the input convolution layer. The quantity of convolution kernels of the input convolution layer is used to indicate a quantity of feature extraction modes for feature extraction from the picture feature point of the low-resolution sub-picture. The dimensions of the feature map of the input convolution layer are used to adjust complexity of the deep neural network model. A larger quantity of convolution kernels of the input convolution layer leads to larger dimensions of the feature map of the input convolution layer. Higher complexity of the deep neural network model leads to a more accurate picture conversion result.

In order to improve accuracy of the picture conversion result, a convolution kernel quantity setting unit 93 may set a relatively large quantity of feature extraction modes, and therefore, the quantity of convolution kernels of the input convolution layer is set to a relatively large value, for example, set to 14-18, and the like.

For example, if the input feature point of a low-resolution sub-picture is a feature point matrix of 32*32, then a feature (that is, the quantity of convolution kernels of the input convolution layer is 3) of the picture point may be extracted using a red pixel brightness value, a blue pixel brightness value, and a green pixel brightness value. If a convolution template parameter of the input convolution layer is set to 5*5, then the dimensions of the feature map of the input convolution layer are 28*28, that is, a feature map of 28*28 may be obtained using a 5*5 parameter matrix to sequentially traverse a feature point matrix of 32*32. Therefore, obtained output data of the input convolution layer is 28*28*3.

In addition, non-linear processing further needs to be performed on the output data of the input convolution layer using the input activation layer, to ensure that the output of the input convolution layer is differentiable, thereby ensuring normal operation of parameter training of the subsequent deep neural network model.

III. The non-linear conversion convolution layer and activation layer creation unit 99 of the model generating module 73 creates a plurality of non-linear conversion convolution layers and a corresponding non-linear conversion activation layer of the deep neural network model according to the output data of the input activation layer data of the deep neural network model acquired by the input convolution layer and activation layer creation unit 98, a quantity of convolution kernels of a non-linear conversion convolution layer, dimensions of a feature map of the non-linear conversion convolution layer, and a convolution template parameter of the non-linear conversion convolution layer. For example, five non-linear conversion convolution layers and corresponding non-linear conversion activation layers are disposed, and a plurality of non-linear conversion convolution layers and corresponding non-linear conversion activation layers are connected in sequence. For example, an output of a non-linear conversion convolution layer A1 is connected to an input of a non-linear conversion activation layer B1 is connected, an output of the non-linear conversion activation layer B1 is connected to an input of a non-linear conversion convolution layer A2, an output of the non-linear conversion convolution layer A2 is connected to an input of a non-linear conversion activation layer B2, and so on.

The output data of the input activation layer of the deep neural network model herein is an input of the first non-linear conversion convolution layer. The quantity of convolution kernels of the non-linear conversion convolution layer is used to indicate a quantity of feature extraction modes for feature extraction from the output data of the input activation layer, and the dimensions of the feature map of the non-linear conversion convolution layer and the convolution template parameter of the non-linear conversion convolution layer are used to adjust the complexity of the deep neural network model.

In order to reduce the calculation amount of the deep neural network model herein, the convolution kernel quantity setting unit 93 may set a relatively small quantity of feature extraction modes, and therefore, the quantity of convolution kernels of the non-linear conversion convolution layer is set to a relatively small value, for example, set to 4-6, and the like. That is, the quantity of convolution kernels of the input convolution layer is greater than the quantity of convolution kernels of the non-linear conversion convolution layer.

Specifically, a convolution template parameter setting unit 94 sets convolution template parameters of all non-linear conversion convolution layers by alternately using a first parameter matrix and a second parameter matrix. Preferably, the first parameter matrix is 1*1, and the second parameter matrix is 3*3. For example, a convolution template parameter of the non-linear conversion convolution layer A1 is 1*1, a convolution template parameter of the non-linear conversion convolution layer A2 is 3*3, a convolution template parameter of the non-linear conversion convolution layer A3 is 1*1, and so on. In this way, a non-linear characteristic of the deep neural network model may be effectively improved, and variations of dimensions of the feature map of the non-linear conversion convolution layer may be reduced, thereby further reducing the calculation amount of the deep neural network model, so that convergence of the deep neural network model during parameter training of the subsequent deep neural network model is ensured, and overfitting is not easy to occur.

In addition, non-linear processing further needs to be performed on the output data of the non-linear conversion convolution layer using the non-linear conversion activation layer, to ensure that the output of the input convolution layer is differentiable, thereby ensuring normal operation of parameter training of the subsequent deep neural network model.

IV. A pre-output convolution layer and activation layer creation unit 9A of the model generating module 73 creates a pre-output convolution layer and a pre-output activation layer of the deep neural network model according to output data of the last one non-linear conversion activation layer of the deep neural network model acquired by the non-linear conversion convolution layer and activation layer creation unit 99, a quantity of convolution kernels of the pre-output convolution layer, and dimensions of a feature map of the pre-output convolution layer.

The output data of the last one non-linear conversion activation layer of the deep neural network model is an input of the input convolution layer, the quantity of convolution kernels of the pre-output convolution layer is used to indicate a quantity of feature extraction modes for feature extraction from the output data of the last one non-linear conversion activation layer, and the dimensions of the feature map of the input convolution layer are used to adjust the complexity of the deep neural network model.

In order to improve accuracy of the picture conversion result, the quantity that is of convolution kernels of the pre-output convolution layer and that is set by the convolution kernel quantity setting unit 93 is equal to the quantity of convolution kernels of the input convolution layer, for example, both are set to 14-18, and the like. In this way, after non-linear conversion is performed on the non-linear conversion activation layer, the same feature extraction mode may be used to generate a high-resolution sub-picture.

In addition, non-linear processing further needs to be performed on the output data of the corresponding pre-output convolution layer using the pre-output activation layer, to ensure that the output of the pre-output convolution layer is differentiable, thereby ensuring normal operation of parameter training of the subsequent deep neural network model.

V. An output convolution layer creation unit 9B of the model generating module 73 creates an output convolution layer of the deep neural network model according to data of the pre-output activation layer of the deep neural network model acquired by the pre-output convolution layer and activation layer creation unit 9A, a quantity of convolution kernels of the output convolution layer, and dimensions of a feature map of the output convolution layer.

The output data of the pre-output activation layer of the deep neural network model is an input of the output convolution layer, the quantity of convolution kernels of the output convolution layer is used to indicate a quantity of feature extraction modes for feature extraction from the output data of the pre-output activation layer, and the dimensions of the feature map of the pre-output activation layer are used to adjust the complexity of the deep neural network model.

In order to ensure the accuracy of the picture conversion result, the dimensions that are of the feature map of the output convolution layer and that are set by a feature map dimension setting unit 92 are the same as the dimensions of the feature map of the input convolution layer. In this way, the same quantity of picture feature points may be output and compared with the output comparison sample (the picture feature point of the high-resolution sub-picture).

VI. The model generating unit 9C of the model generating module 73 generates a corresponding deep neural network model based on data of the output convolution layer of the deep neural network model acquired by the output convolution layer creation unit 9B and the picture feature point of the high-resolution sub-picture.

The model generating unit 9C compares output data of the output convolution layer of the deep neural network model by using the picture feature point of the high-resolution sub-picture, and corrects the parameter of the deep neural network model according to a comparison result, so that a difference between the output data of the output convolution layer of the deep neural network model and the picture feature point of the high-resolution sub-picture is less than a set value. In this way, the corresponding deep neural network model may be determined.

Specifically, in order to accelerate a machine training speed of the deep neural network model, the model parameter initialization unit 95 may use the PReLU (parametric rectified linear unit) algorithm in advance to perform a parameter (such as a convolution template parameter w and a bias parameter b) initialization operation on the deep neural network model, so that the deep neural network model converges more rapidly.

In addition, a model parameter operation unit 96 may further use an adaptive moment (Adam) estimation algorithm to perform an iterative operation on the deep neural network model, thereby acquiring a parameter in the deep neural network model rapidly and accurately.

In this way, the process of generating the deep neural network model of the model generating device 70 of this embodiment is completed.

The deep neural network model of this embodiment effectively reduces the calculation amount of the deep neural network model by disposing a plurality of non-linear conversion convolution layers with a small quantity of convolution kernels. In addition, the quantity of convolution kernels of the pre-output convolution layer is equal to the quantity of convolution kernels of the input convolution layer, and the dimensions of the feature map of the output convolution layer is the same as the dimensions of the input convolution layer, so that the operation accuracy of the deep neural network model is further improved.

Figure 11A:
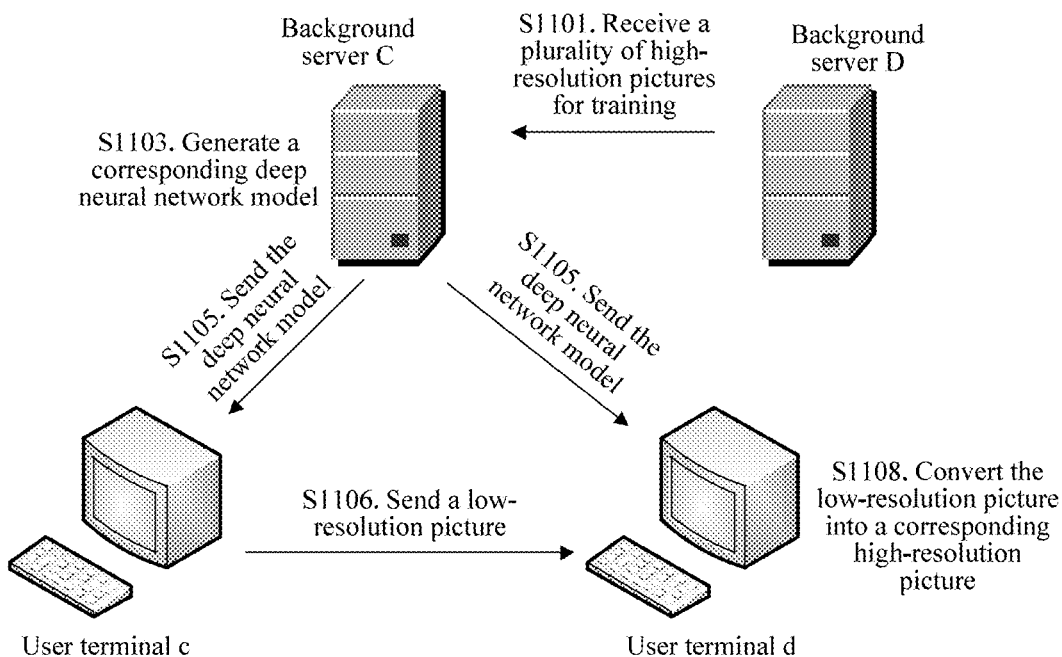
FIG. 11A is a schematic diagram of a working principle of a specific embodiment of a method for generating a high-resolution picture and a device for generating a high-resolution picture according to this application.
Figure 11B:
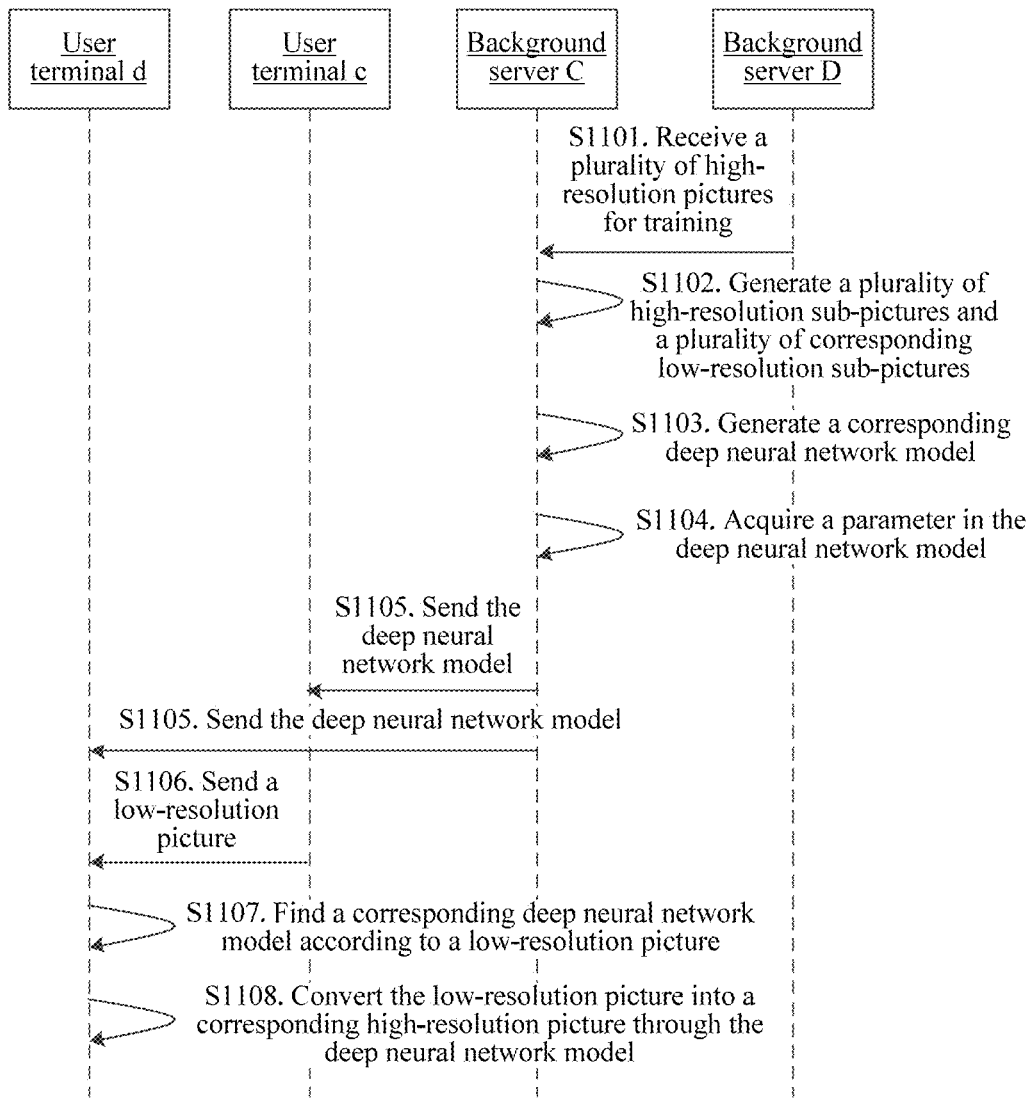
FIG. 11B is a sequence diagram of an operation of a specific embodiment of a method for generating a high-resolution picture and a device for generating a high-resolution picture according to this application.

The method for generating a high-resolution picture and the working principle of the device for generating a high-resolution picture of this application are described by using a specific embodiment below. FIG. 11A is a schematic diagram of a working principle of a specific embodiment of a method for generating a high-resolution picture and a device for generating a high-resolution picture according to this application. FIG. 11B is a sequence diagram of an operation of a specific embodiment of a method for generating a high-resolution picture and a device for generating a high-resolution picture according to this application.

A model generating device is a background server C, the background server C being connected to a background server D, a user terminal c, and a user terminal d, respectively. The background server C is configured to generate a deep neural network model, the background server D is configured to provide a high-resolution picture for training, and the user terminal c and the user terminal d are two user terminals for information interaction. The method for generating a high-resolution picture in this specific embodiment includes the following steps.

Step S1101: The background server C receives a plurality of high-resolution pictures for training from a background server D.

Step S1102: The background server C segments and converts the received high-resolution picture for training by using a preset picture conversion algorithm, to generate a plurality of high-resolution sub-pictures and a plurality of corresponding low-resolution sub-pictures.

Step S1103: The background server C generates a corresponding deep neural network model by using the low-resolution sub-picture as an input sample of a deep neural network framework and by using the high-resolution sub-picture as an output comparison sample of the deep neural network framework.

A pixel brightness value of a picture pixel in the low-resolution sub-picture is used as a picture feature point of the low-resolution sub-picture, and a pixel brightness value of a picture pixel in the high-resolution sub-picture is used as a picture feature point of the high-resolution sub-picture.

Figure 12:
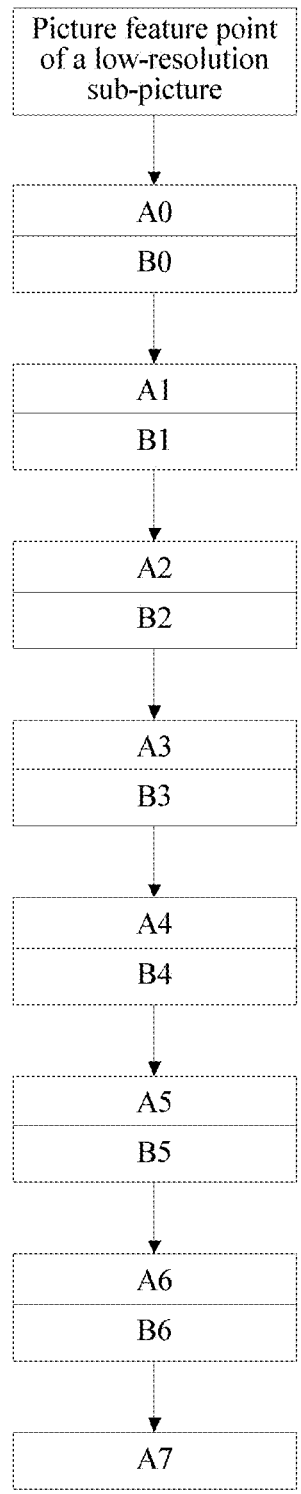
FIG. 12 is a schematic structural diagram of a deep neural network model of a specific embodiment of a method for generating a high-resolution picture and a device for generating a high-resolution picture according to this application.

As shown in FIG. 12, the deep neural network model includes an input convolution layer (A0) and a corresponding input activation layer (B0), five non-linear conversion convolution layers (A1, A2, A3, A4, A5) and corresponding non-linear conversion activation layers (B1, B2, B3, B4, B5), a pre-output convolution layer (A6), a pre-output activation layer (B6), and an output convolution layer (A7).

The input convolution layer and the pre-output convolution layer both have 16 convolution kernels, the non-linear conversion activation layers all have 5 convolution kernels, and the output convolution layer has one convolution kernel. Dimensions of a feature map of the input convolution layer are the same as dimensions of a feature map of the output convolution layer. Convolution template parameters of the five non-linear conversion convolution layers and the pre-output convolution layer are successively 1*1, 3*3, 1*1, 3*3, 1*1, and 3*3. Dimensions of a feature map of the input convolution layer are the same as dimensions of a feature map of the output convolution layer.

Step S1104: The background server C performs a parameter initialization operation on the deep neural network model by using a parametric rectified linear unit (PReLU) algorithm; and then performs an iterative operation on the deep neural network model by using an adaptive moment (Adam) estimation algorithm, to obtain a parameter (for example, a convolution template parameter w, and the like) in the deep neural network model.

Step S1105: The background server C sends, to the user terminal c and the user terminal d, the deep neural network model obtained through training.

Step S1106: When the user terminal C needs to send a certain high-resolution picture to the user terminal D, the user terminal C may convert the high-resolution picture into a corresponding low-resolution picture by using a corresponding picture conversion algorithm, and then send the low-resolution picture to the user terminal D.

Step S1107: The user terminal d finds a corresponding deep neural network model in local when receiving the low-resolution picture.

Step S1108: The user terminal d converts the low-resolution picture into the high-resolution picture through the deep neural network model.

In this way, the process of converting the high-resolution picture of this specific embodiment is completed.

The user terminal C neither needs to use a large amount of storage space to store the high-resolution picture, nor needs to consume higher bandwidth to transmit the high-resolution picture. In addition, the user terminal D only needs to implement accurate conversion from the low-resolution picture to the high-resolution picture according to a preset deep neural network model without needing to perform a complicated picture conversion operation on the low-resolution picture.

In addition, the entire deep neural network model has a simple structure, has relatively high convergence, and is not prone to overfitting. Therefore, the entire deep neural network model has a relatively small amount of operations, a short training time, and high accuracy.

According to the method and device for generating a high-resolution picture and the storage medium of this application, the accuracy of converting the low-resolution picture into the high-resolution picture is improved by creating the deep neural network model with the non-linear conversion convolution layer, thereby reducing interaction costs of multimedia picture information of both sides of the interactive terminal and improving the interaction efficiency of multimedia picture information of both sides of the interactive terminal, so that the existing technical problem that the method for generating a high-resolution picture and the device for generating a high-resolution picture have relatively high information interaction costs and relatively low information interaction efficiency is effectively resolved.

The terms, such as "component", "module", "system", "interface", and "process", used in the present disclosure generally indicate a computer-related entity: hardware, a combination of hardware and software, software, or software in execution. For example, a component may be, but is not limited to, a process running on a processor, a processor, an object, an executable application, an executed thread, a program, and/or a computer. With reference to the drawings, an application running on a controller and the controller may both be components. One or more components may be in an executed process and/or thread and the components may be located on one computer and/or distributed between or among two or more computers.

Figure 13:
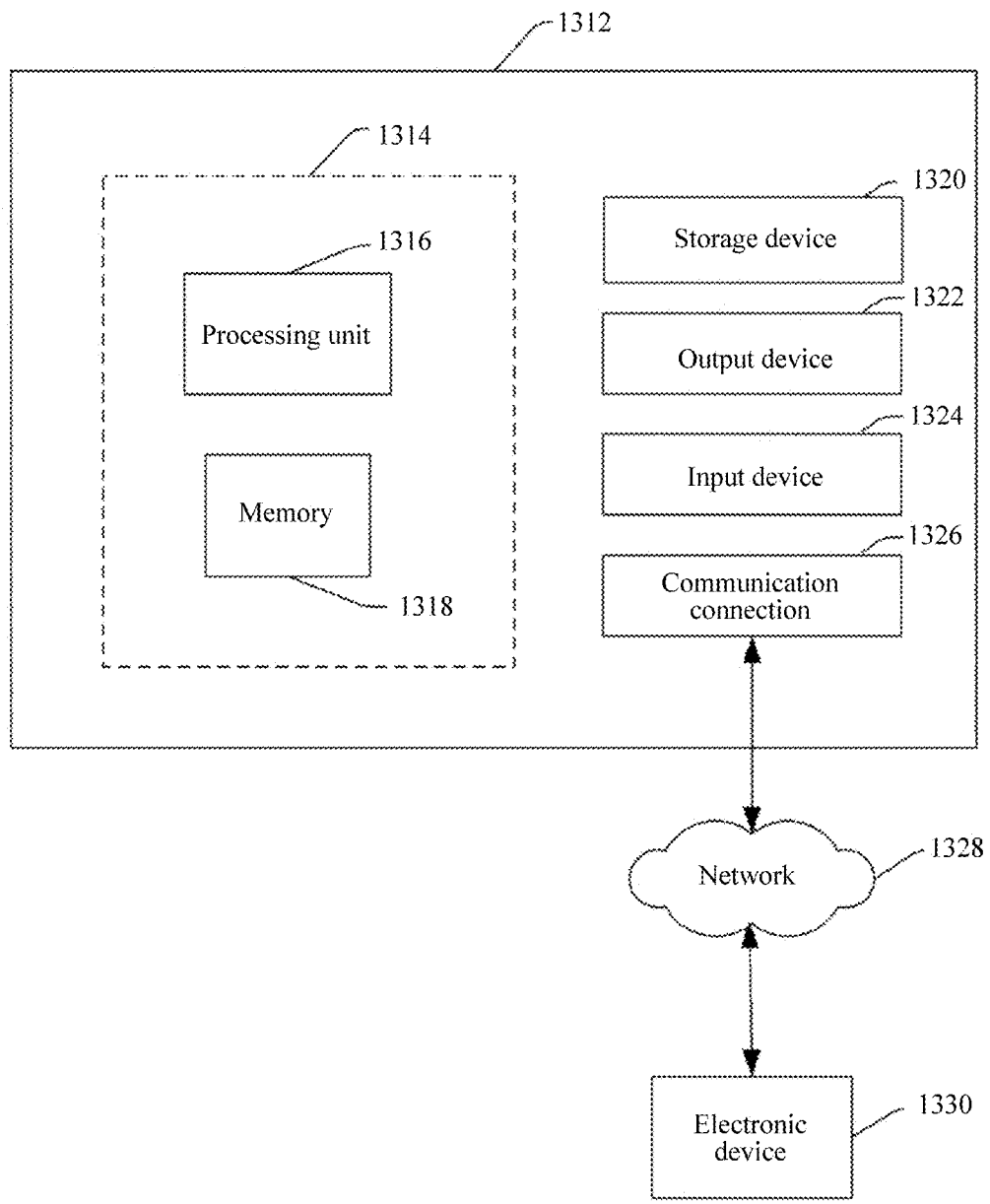
FIG. 13 is a schematic structural diagram of a working environment of an electronic device in which a device for generating a high-resolution picture is located according to this application.

FIG. 13 and subsequent discussions provide a brief and general description for implementing a working environment of an electronic device in which a high-resolution picture generating apparatus in this application are located. The working environment in FIG. 13 is only an instance of a suitable working environment, and is not intended to suggest any limitation to a scope of a purpose or a function of the working environment. An electronic device 1312 in this example includes, but is not limited to, a wearable device, a head-mounted device, a healthcare platform, a personal computer, a server computer, a handheld or laptop device, a mobile device (for example, a mobile phone, a personal digital assistant (PDA), or a media player), a multiprocessor system, a consumer electronic device, a small computer, a large computer, a distributed computing environment including any of the foregoing systems or devices, and the like.

Although not required, this embodiment is described under a general background that "a computer-readable instruction" is executed by one or more electronic devices. The computer-readable instruction may be distributed by a computer-readable medium (discussed below). The computer readable instructions may be implemented as a program module, for example, a function, an object, an application programming interface (API), or a data structure for executing a specific task or implementing a specific abstract data type. Typically, functions of the computer readable instruction may be randomly combined or distributed in various environments.

FIG. 13 shows instances of one or more electronic devices 1312 including the high-resolution picture generating apparatus in this application. In a configuration, the electronic device 1312 includes at least one processing unit 1316 and a memory 1318. According to a specific configuration and type of an electronic device, the storage unit 1318 may be volatile (for example, a RAM), non-volatile (for example, a ROM or a flash memory), or a combination thereof. The configuration is represented by a dashed line 1314 in FIG. 13.

In another embodiment, the electronic device 1312 may include an additional feature and/or function. For example, the device 1312 may further include an additional storage apparatus (for example, a removable/or non-removable storage apparatus), and includes, but is not limited to, a magnetic storage apparatus, an optical storage apparatus, and the like. The additional storage apparatus is represented by using a storage apparatus 1320 in FIG. 13. In an embodiment, a computer-readable instruction used to implement one or more embodiments provided in the present disclosure may be stored in the storage apparatus 1320. The storage apparatus 1320 may further be configured to store other computer-readable instructions for implementing an operating system, an application program, and the like. The computer readable instructions may be added into the memory 1318 to be executed by, for example, the processing unit 1316.

The term "computer-readable media" used in the present disclosure includes a computer storage medium. The computer storage medium includes volatile and non-volatile media, and removable and non-removable media implemented by using any method or technology used for storing information such as a computer readable instruction, a data structure, a program module, or other data. The memory 1318 and the storage apparatus 1320 are instances of the computer storage media. The computer storage media includes, but is not limited to a RAM, a ROM, an EEPROM, a flash memory or another storage technology, a CD-ROM, a digital versatile disc (DVD) or another optical storage apparatus, a cassette, a magnetic tape, a magnetic disk storage device, or any other media configured to store desired information and accessed by the electronic device 1312. Such a computer storage medium may be a part of the electronic device 1312.

The electronic device 1312 may further include a communications connection 1326 allowing communication between the electronic device 1312 and another device. The communications connection 1326 may include, but is not limited to, a modem, a network interface card (NIC), an integrated network interface, RF transmitter/receiver, infrared port, a USB connection, or another interface configured to connect the electronic device 1312 to another electronic device. The communications connection 1326 may include a wired connection or a wireless connection. The communications connection 1326 may transmit and/or receive a communications medium.

The term "computer-readable media" may include the communications medium. The communications medium typically includes a computer readable instruction or other data in a "modulated data signal" of a carrier or another transmission mechanism, and includes any information delivery medium. The term "modulated data signal" may include such a signal: One or more features of the signal are set or changed by encoding information into the signal.

The electronic device 1312 may include an input device 1324, for example, a keyboard, a mouse, a stylus, a voice input device, a touch input device, an infrared camera, a video input device, and/or any other input device. The device 1312 may further include an output device 1322, for example, one or more displays, a speaker, a printer, and/or any other output device. The input device 1324 and the output device 1322 may be connected to the electronic device 1312 through a wired connection, a wireless connection, or any combination thereof. In an embodiment, an input device or an output device of another electronic device may be used as the input device 1324 or the output device 1322 of the electronic device 1312.

The components of the electronic device 1312 may be connected by using various interconnects (for example, a bus). Such interconnections may include a peripheral component interconnection (PCI) (for example, a rapid PCI), a universal serial bus (USB), a live wire (for example, IEEE 1394), an optical bus structure, and the like. In another embodiment, the components of the electronic device 1312 may be interconnected by using a network. For example, the memory 1318 may include a plurality of physical memory units located at different physical positions and interconnected by using the network.

A person skilled in the art may be aware that a storage device configured to store the computer-readable instruction may be distributed across the network. For example, the electronic device 1330 that may be accessed by using a network 1328 may store a computer-readable instruction used to implement one or more embodiments of the present disclosure. The electronic device 1312 may access the electronic device 1330 and download a part or all of the computer-readable instruction for execution. Alternatively, the electronic device 1312 may download a plurality of computer-readable instructions as required, or some instructions may be executed by the electronic device 1312 and some instructions may be executed by the electronic device 1330.

The present disclosure provides various operations of embodiments. In an embodiment, the one or more operations may constitute one or more computer-readable instructions stored on a computer-readable medium, and the computer-readable instructions enable a computing device to perform the operations when the computer-readable instructions are executed by an electronic device. Describing a sequence of some or all operations shall not be interpreted as implying that the operations need to be sequentially related. A person skilled in the art will understand an alternative sequence having the benefits of the present specification. Moreover, it is to be understood that not all operations necessarily exist in each embodiment provided in the present disclosure.

Furthermore, although the present disclosure is shown and described by using one or more implementations, a person skilled in the art may conceive of equivalent variations and modifications based on reading and understanding on the specification and the accompany drawings. The present disclosure includes all such variations and modifications, which is only limited by the scope of the appended claims. In particular regard to the various functions performed by the foregoing components (such as elements and resources), terms used to describe such components are intended to correspond to any component (unless indicated otherwise) performing specified functions of the components (for example, the components are equivalent in functions), even though structures of the functions are not equivalent to the disclosed structures of functions in the exemplary implementations in the present disclosure shown in the specification. In addition, although specific features of the specification are disclosed with respect to only one of several implementations, the features may be combined with one or more other features of other implementations that are desirable for and advantageous to a given or specific application. Moreover, when the terms "include", "include", "contain" and any variants thereof are used in a specific implementation or the claims, the terms are intended to cover in a manner similar to "include".

Functional units according to the embodiments of this application may be integrated in one processing module or exist as separate physical units, or two or more units are integrated in one module. The integrated module may be implemented in a form of hardware, or may be implemented in a form of a software functional module. When the integrated module is implemented in the form of a software functional module and sold or used as an independent product, the integrated module may be stored in a computer-readable storage medium. The storage medium may be a read-only memory, a magnetic disk, an optical disc, or the like. The foregoing apparatuses or systems can execute methods in corresponding process embodiments.

It is to be understood that the steps in the embodiments of this application are not necessarily sequentially performed in an order indicated by step numbers. Unless otherwise clearly described in this specification, an order of performing the steps is not strictly limited, and the steps may be performed in another order. In addition, at least some steps in the embodiments may include a plurality of sub-steps or a plurality of stages. The sub-steps or stages are not necessarily performed at a same moment, and instead may be performed at different moments. The sub-steps or stages are not necessarily sequentially performed, and instead the sub-steps or stages and at least some of other steps or sub-steps or stages of other steps may be performed by turns or alternately.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM(EPROM), an electrically erasable programmable ROM(EEPROM), or a flash. The volatile memory may include a random access memory (RAM) or an external cache memory. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM), and the like.

What is claimed is:

1. A method for generating a high-resolution picture, comprising:
    acquiring, by a computer device, a plurality of deep neural network models, each deep neural network model of the plurality of deep neural network models being generated according to a corresponding high-resolution picture, a picture conversion algorithm, and a deep neural network framework;
    acquiring, by the computer device, a low-resolution picture, the low-resolution picture being generated according to a first high-resolution picture and the picture conversion algorithm;
    identifying, by the computer device, a first deep neural network model of the plurality of deep neural network models, the first deep neural network model corresponding to the low-resolution picture; and
    converting, by the computer device, the low-resolution picture into the first high-resolution picture using the first deep neural network model, the converting comprising:
        performing an interpolation magnification operation on the low-resolution picture to obtain a magnified low-resolution picture;
        acquiring a picture feature point of the low-resolution picture based on a pixel brightness value of a picture pixel in the magnified low-resolution picture;
        converting the picture feature point of the low-resolution picture into a picture feature point of the high-resolution picture; and
        acquiring the high-resolution picture according to the picture feature point of the high-resolution picture and a density offset of the low-resolution picture;
    the first deep neural network model comprising a plurality of non-linear conversion convolution layers that alternately use different parameter matrices as convolution template parameters.

2. The method according to claim 1, wherein the operation of generating the first deep neural network model comprises:
    segmenting, by the computer device, the corresponding high-resolution picture into a plurality of high-resolution sub-pictures;
    performing, by the computer device, picture conversion on each of the plurality of high-resolution sub-pictures by using the picture conversion algorithm, to obtain a low-resolution sub-picture corresponding to the high-resolution sub-picture; and
    generating, by the computer device, the first deep neural network model by using each low-resolution sub-picture as an input sample of the deep neural network framework and by using the corresponding high-resolution sub-picture as an output comparison sample of the deep neural network framework.

3. The method according to claim 2, wherein the operation of performing, by the computer device, picture conversion on each of the plurality of high-resolution sub-pictures by using the picture conversion algorithm, to obtain a low-resolution sub-picture corresponding to the high-resolution sub-picture comprises:
    performing, by the computer device, a picture scaling-down operation on the high-resolution sub-picture according to a preset scaling ratio; and
    performing, by the computer device and using a preset compression algorithm, a picture compression operation on the high-resolution sub-picture after the picture scaling-down operation, to obtain the low-resolution sub-picture corresponding to the high-resolution sub-picture.

4. The method according to claim 2, wherein the operation of generating, by the computer device, the first deep neural network model further comprises:
    extracting, by the computer device, a picture feature point of the low-resolution sub-picture;
    creating, by the computer device, an input convolution layer and a corresponding input activation layer of the first deep neural network model according to the picture feature point of the low-resolution sub-picture, a quantity of convolution kernels of the input convolution layer, and dimensions of a feature map of the input convolution layer;
    creating, by the computer device, a first non-linear conversion convolution layer of the plurality of non-linear conversion convolution layers and a corresponding non-linear conversion activation layer of the first deep neural network model according to data of the input activation layer data, a quantity of convolution kernels of the first non-linear conversion convolution layer, dimensions of a feature map of the first non-linear conversion convolution layer, and the convolution template parameter of the first non-linear conversion convolution layer;
    creating, by the computer device, a pre-output convolution layer and a pre-output activation layer of the first deep neural network model according to data of the plurality of non-linear conversion activation layers, a quantity of convolution kernels of the pre-output convolution layer, and dimensions of a feature map of the pre-output convolution layer;
    creating, by the computer device, an output convolution layer of the first deep neural network model according to data of the pre-output activation layer, a quantity of convolution kernels of the output convolution layer, and dimensions of a feature map of the output convolution layer; and wherein the first deep neural network model is generated based on data of the output convolution layer and a picture feature point of the high-resolution sub-picture.

5. The method according to claim 4, wherein the operation of extracting, by the computer device, a picture feature point of the low-resolution sub-picture comprises:
performing, by the computer device, a bicubic interpolation magnification operation on the low-resolution sub-picture, to obtain a low-resolution sub-picture after the magnification operation; and
acquiring, by the computer device, a picture feature point of the low-resolution sub-picture based on a pixel brightness value of a picture pixel in the low-resolution sub-picture after the magnification operation.

6. The method according to claim 4, further comprising:
acquiring, by the computer device, the picture feature point of the high-resolution sub-picture based on a pixel brightness value of a picture pixel in the high-resolution sub-picture.

7. The method according to claim 4, further comprising:
setting, by the computer device, the dimensions of the feature map of the input convolution layer and the dimensions of the feature map of the output convolution layer;
the dimensions of the feature map of the input convolution layer being the same as the dimensions of the feature map of the output convolution layer.

8. The method according to claim 4, further comprising:
setting, by the computer device, the quantity of convolution kernels of the input convolution layer and the quantity of convolution kernels of the pre-output convolution layer;
the quantity of convolution kernels of the input convolution layer being the same as the quantity of convolution kernels of the pre-output convolution layer.

9. The method according to claim 8, further comprising:
setting, by the computer device, the quantity of convolution kernels of the non-linear conversion convolution layer;
the quantity of convolution kernels of the input convolution layer being greater than the quantity of convolution kernels of the non-linear conversion convolution layer.

10. The method according to claim 4, further comprising setting, by the computer device, convolution template parameters of the plurality of non-linear conversion convolution layers by alternately using a first parameter matrix and a second parameter matrix.

11. The method according to claim 4, further comprising:
performing, by the computer device, a parameter initialization operation on the deep neural network model by using a parametric rectified linear unit (PReLU) algorithm; and
performing, by the computer device, an iterative operation on the deep neural network model by using an adaptive moment (Adam) estimation algorithm, to obtain a parameter in the deep neural network model.

12. A computer device, comprising memory and a processor, the memory storing computer-readable instructions, the computer-readable instructions, when executed by the processor, causing the processor to perform the following operations:
acquiring a plurality of deep neural network models, each deep neural network model of the plurality of deep neural network models being generated according to a corresponding high-resolution picture, a picture conversion algorithm, and a deep neural network framework;
acquiring a low-resolution picture, the low-resolution picture being generated according to a first high-resolution picture and the picture conversion algorithm;
identifying a first deep neural network model of the plurality of deep neural network models, the first deep neural network model corresponding to the low-resolution picture; and
converting the low-resolution picture into the first high-resolution picture using the first deep neural network model, the converting comprising:
performing an interpolation magnification operation on the low-resolution picture to obtain a magnified low-resolution picture;
acquiring a picture feature point of the low-resolution picture based on a pixel brightness value of a picture pixel in the magnified low-resolution picture;
converting the picture feature point of the low-resolution picture into a picture feature point of the high-resolution picture; and
acquiring the high-resolution picture according to the picture feature point of the high-resolution picture and a density offset of the low-resolution picture;
the first deep neural network model comprising a plurality of non-linear conversion convolution layers that alternately use different parameter matrices as convolution template parameters.

13. The computer device according to claim 12, wherein the operation of generating the first deep neural network model comprises:
segmenting the corresponding high-resolution picture into a plurality of high-resolution sub-pictures;
performing picture conversion on each of the plurality of high-resolution sub-pictures by using the picture conversion algorithm, to obtain a low-resolution sub-picture corresponding to the high-resolution sub-picture; and
generating the first deep neural network model by using each low-resolution sub-picture as an input sample of the deep neural network framework and by using the corresponding high-resolution sub-picture as an output comparison sample of the deep neural network framework.

14. The computer device according to claim 13, wherein the operation of performing picture conversion on each of the plurality of high-resolution sub-pictures by using the picture conversion algorithm, to obtain a low-resolution sub-picture corresponding to the high-resolution sub-picture comprises:
performing a picture scaling-down operation on the high-resolution sub-picture according to a preset scaling ratio; and
performing, using a preset compression algorithm, a picture compression operation on the high-resolution sub-picture after the picture scaling-down operation, to obtain the low-resolution sub-picture corresponding to the high-resolution sub-picture.

15. The computer device according to claim 13, wherein the computer-readable instructions further cause the processor to perform the following operations:
extracting a picture feature point of the low-resolution sub-picture;
creating an input convolution layer and a corresponding input activation layer of the first deep neural network model according to the picture feature point of the low-resolution sub-picture, a quantity of convolution kernels of the input convolution layer, and dimensions of a feature map of the input convolution layer;

creating a first non-linear conversion convolution layer of the plurality of non-linear conversion convolution layers and a corresponding non-linear conversion activation layer of the first deep neural network model according to data of the input activation layer data, a quantity of convolution kernels of the first non-linear conversion convolution layer, dimensions of a feature map of the first non-linear conversion convolution layer, and the convolution template parameter of the first non-linear conversion convolution layer;

creating a pre-output convolution layer and a pre-output activation layer of the first deep neural network model according to data of the plurality of non-linear conversion activation layers, a quantity of convolution kernels of the pre-output convolution layer, and dimensions of a feature map of the pre-output convolution layer;

creating an output convolution layer of the first deep neural network model according to data of the pre-output activation layer, a quantity of convolution kernels of the output convolution layer, and dimensions of a feature map of the output convolution layer; and wherein the first deep neural network model is generated based on data of the output convolution layer and a picture feature point of the high-resolution sub-picture.

16. The computer device according to claim 15, wherein the operation of extracting a picture feature point of the low-resolution sub-picture comprises:

performing a bicubic interpolation magnification operation on the low-resolution sub-picture, to obtain a low-resolution sub-picture after the magnification operation; and acquiring a picture feature point of the low-resolution sub-picture based on a pixel brightness value of a picture pixel in the low-resolution sub-picture after the magnification operation.

17. The computer device according to claim 15, wherein the computer-readable instructions further cause the processor to perform the following operation:

acquiring the picture feature point of the high-resolution sub-picture based on a pixel brightness value of a picture pixel in the high-resolution sub-picture.

18. One or more non-transitory, non-volatile storage media storing computer-readable instructions, the computer-readable instructions, when executed by one or more processors, causing the one or more processors to perform the following operations:

acquiring a plurality of deep neural network models, each deep neural network model of the plurality of deep neural network models being generated according to a corresponding high-resolution picture, a picture conversion algorithm, and a deep neural network framework;

acquiring a low-resolution picture, the low-resolution picture being generated according to a first high-resolution picture and the picture conversion algorithm;

identifying a first deep neural network model of the plurality of deep neural network models, the first deep neural network model corresponding to the low-resolution picture; and converting the low-resolution picture into the first high-resolution picture using the first deep neural network model, the converting comprising:

performing an interpolation magnification operation on the low-resolution picture to obtain a magnified low-resolution picture;

acquiring a picture feature point of the low-resolution picture based on a pixel brightness value of a picture pixel in the magnified low-resolution picture;

converting the picture feature point of the low-resolution picture into a picture feature point of the high-resolution picture; and acquiring the high-resolution picture according to the picture feature point of the high-resolution picture and a density offset of the low-resolution picture;

the first deep neural network model comprising a plurality of non-linear conversion convolution layers that alternately use different parameter matrices as convolution template parameters.

19. The one or more non-transitory, non-volatile storage media according to claim 18, wherein the operation of generating the first deep neural network model comprises:

segmenting, by the computer device, the corresponding high-resolution picture into a plurality of high-resolution sub-pictures;

performing, by the computer device, picture conversion on each of the plurality of high-resolution sub-pictures by using the picture conversion algorithm, to obtain a low-resolution sub-picture corresponding to the high-resolution sub-picture; and generating, by the computer device, the first deep neural network model by using each low-resolution sub-picture as an input sample of the deep neural network framework and by using the corresponding high-resolution sub-picture as an output comparison sample of the deep neural network framework.

20. The one or more non-transitory, non-volatile storage media according to claim 19, wherein the operation of generating the first deep neural network model further comprises:

extracting, by the computer device, a picture feature point of the low-resolution sub-picture;

creating, by the computer device, an input convolution layer and a corresponding input activation layer of the first deep neural network model according to the picture feature point of the low-resolution sub-picture, a quantity of convolution kernels of the input convolution layer, and dimensions of a feature map of the input convolution layer;

creating, by the computer device, a first non-linear conversion convolution layer of the plurality of non-linear conversion convolution layers and a corresponding non-linear conversion activation layer of the first deep neural network model according to data of the input activation layer data, a quantity of convolution kernels of the first non-linear conversion convolution layer, dimensions of a feature map of the first non-linear conversion convolution layer, and the convolution template parameter of the first non-linear conversion convolution layer;

creating, by the computer device, a pre-output convolution layer and a pre-output activation layer of the first deep neural network model according to data of the plurality of non-linear conversion activation layers, a quantity of convolution kernels of the pre-output convolution layer, and dimensions of a feature map of the pre-output convolution layer;

creating, by the computer device, an output convolution layer of the first deep neural network model according to data of the pre-output activation layer, a quantity of convolution kernels of the output convolution layer, and dimensions of a feature map of the output convolution layer; and wherein the first deep neural network model is generated based on data of the output convolution layer and a picture feature point of the high-resolution sub-picture.

\* \* \* \* \*